(12) United States Patent
Hayakawa

(10) Patent No.: US 9,176,307 B2
(45) Date of Patent: Nov. 3, 2015

(54) ZOOM LENS SYSTEM, OPTICAL APPARATUS, AND METHOD FOR MANUFACTURING ZOOM LENS SYSTEM

(75) Inventor: Satoshi Hayakawa, Ichikawa (JP)

(73) Assignee: Nikon Corporation, Tokyo (JP)

( * ) Notice: Subject to any disclaimer, the term of this patent is extended or adjusted under 35 U.S.C. 154(b) by 158 days.

(21) Appl. No.: 13/989,396

(22) PCT Filed: Nov. 22, 2011

(86) PCT No.: PCT/JP2011/076882
§ 371 (c)(1),
(2), (4) Date: May 23, 2013

(87) PCT Pub. No.: WO2012/070559
PCT Pub. Date: May 31, 2012

(65) Prior Publication Data
US 2013/0293967 A1    Nov. 7, 2013

(30) Foreign Application Priority Data
Nov. 26, 2010    (JP) .................................. 2010-263078

(51) Int. Cl.
G02B 15/16    (2006.01)
G02B 15/20    (2006.01)
G02B 15/14    (2006.01)
(Continued)

(52) U.S. Cl.
CPC ................ G02B 15/14 (2013.01); G02B 15/16 (2013.01); G02B 15/173 (2013.01); G02B 15/20 (2013.01); G03B 3/02 (2013.01); *Y10T 29/49826* (2015.01)

(58) Field of Classification Search
CPC ......... G02B 15/14; G02B 15/16; G02B 15/20

USPC ......................................... 359/676, 683–684
See application file for complete search history.

(56) References Cited

U.S. PATENT DOCUMENTS

| 5,870,231 A | 2/1999 | Takada |
| 6,084,721 A | 7/2000 | Terasawa |
| 7,609,446 B2 | 10/2009 | Nanba |

(Continued)

FOREIGN PATENT DOCUMENTS

| JP | 9-33807 A | 2/1997 |
| JP | 10-161026 A | 6/1998 |

(Continued)

OTHER PUBLICATIONS

English translation of International Preliminary Report on Patentability from International Patent Application No. PCT/JP2011/076882, Jun. 20, 2013.

*Primary Examiner* — Zachary Wilkes
(74) *Attorney, Agent, or Firm* — Miles & Stockbridge P.C.

(57) ABSTRACT

A zoom lens system ZL comprising, in order from an object side: a first lens group G1 having positive refractive power; a second lens group G2 having negative refractive power; a third lens group G3 having positive refractive power; a fourth lens group G4 having negative refractive power; and a fifth lens group G5 having positive refractive power; upon zooming the first lens group G1 being fixed with respect to an image plane in the direction of the optical axis, upon focusing at least a portion of the third lens group G3 being moved along the optical axis, and the zoom lens system satisfying predetermined conditions. An optical apparatus is equipped with the zoom lens system, and there is a method for manufacturing the zoom lens system.

27 Claims, 18 Drawing Sheets

(51) Int. Cl.
 *G02B 15/173* (2006.01)
 *G03B 3/02* (2006.01)

(56) References Cited

U.S. PATENT DOCUMENTS

| | | |
|---|---|---|
| 7,636,201 B2 | 12/2009 | Sudoh et al. |
| 7,719,773 B2 | 5/2010 | Atsuumi et al. |
| 7,864,443 B2 | 1/2011 | Sudoh et al. |
| 7,894,135 B2 | 2/2011 | Nanba |
| 8,031,409 B2 | 10/2011 | Sato |
| 2008/0259454 A1 | 10/2008 | Nanba |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2009/0190220 A1 | 7/2009 | Sato |
| 2009/0251782 A1 | 10/2009 | Nanba |
| 2010/0214658 A1* | 8/2010 | Ito .................................. 359/684 |
| 2011/0122506 A1 | 5/2011 | Ito |

FOREIGN PATENT DOCUMENTS

| | | |
|---|---|---|
| JP | 11-160620 A | 6/1999 |
| JP | 2000-47107 A | 2/2000 |
| JP | 2000-305013 A | 11/2000 |
| JP | 2008-129076 A | 6/2008 |
| JP | 2009-128620 A | 6/2009 |
| JP | 2009-139770 A | 6/2009 |
| JP | 2009-139917 A | 6/2009 |
| JP | 2010-2790 A | 1/2010 |
| JP | 2010-44372 A | 2/2010 |

* cited by examiner

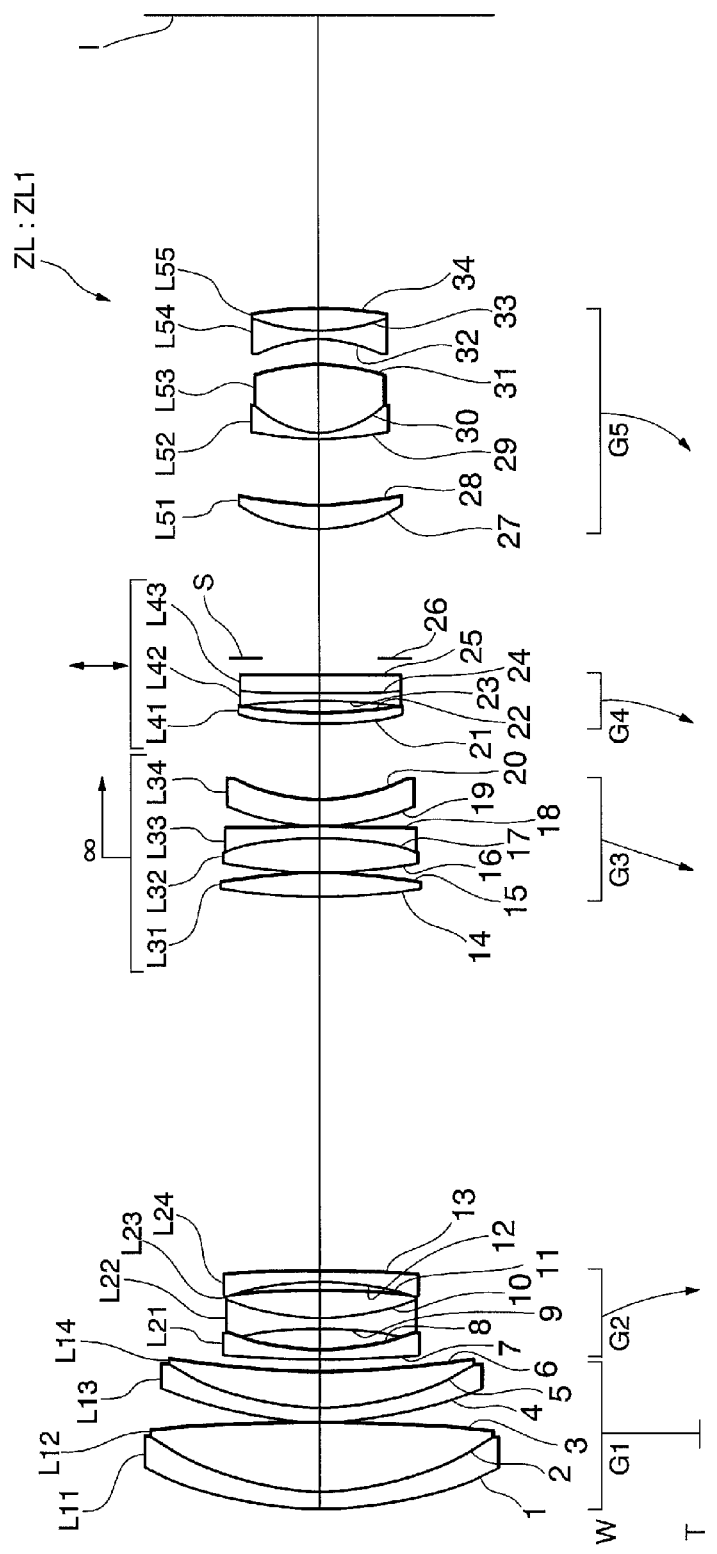

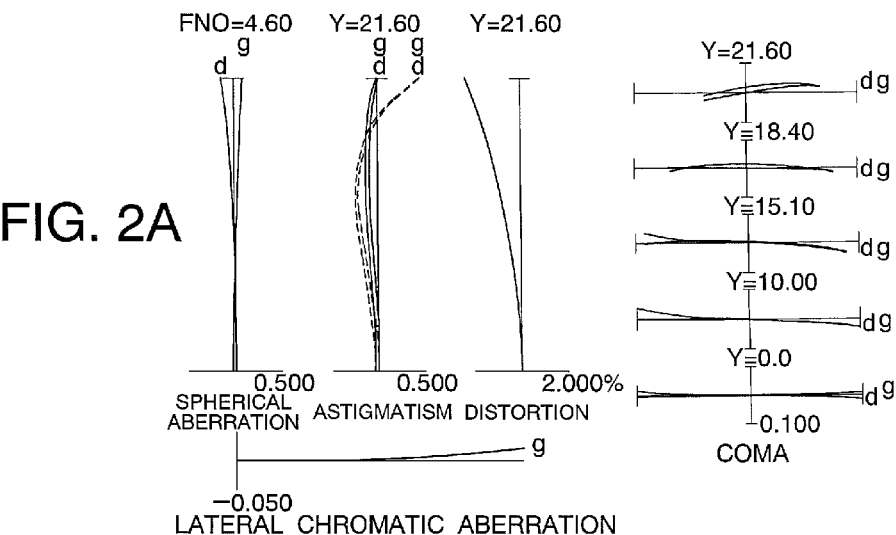
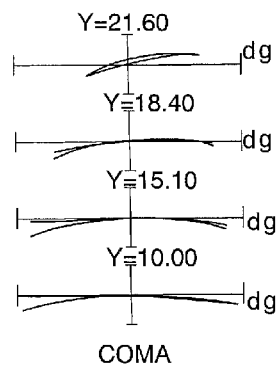
FIG. 2A
FIG. 2B
FIG. 2C

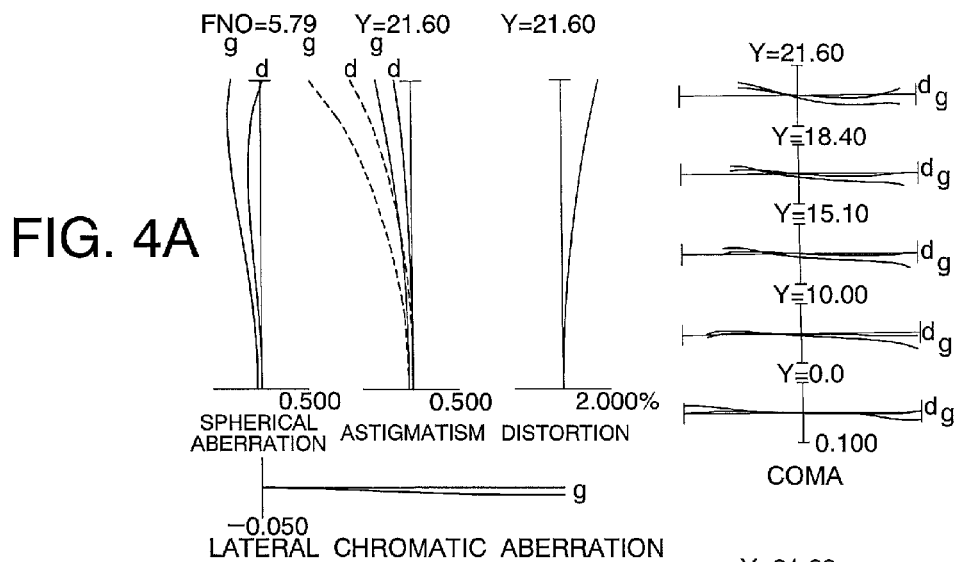
FIG. 4A
FIG. 4B
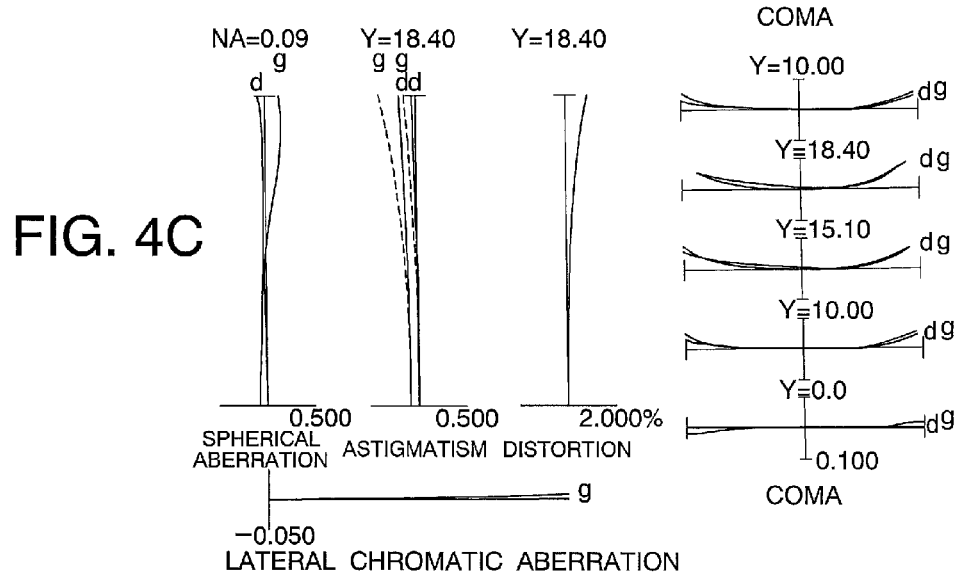
FIG. 4C

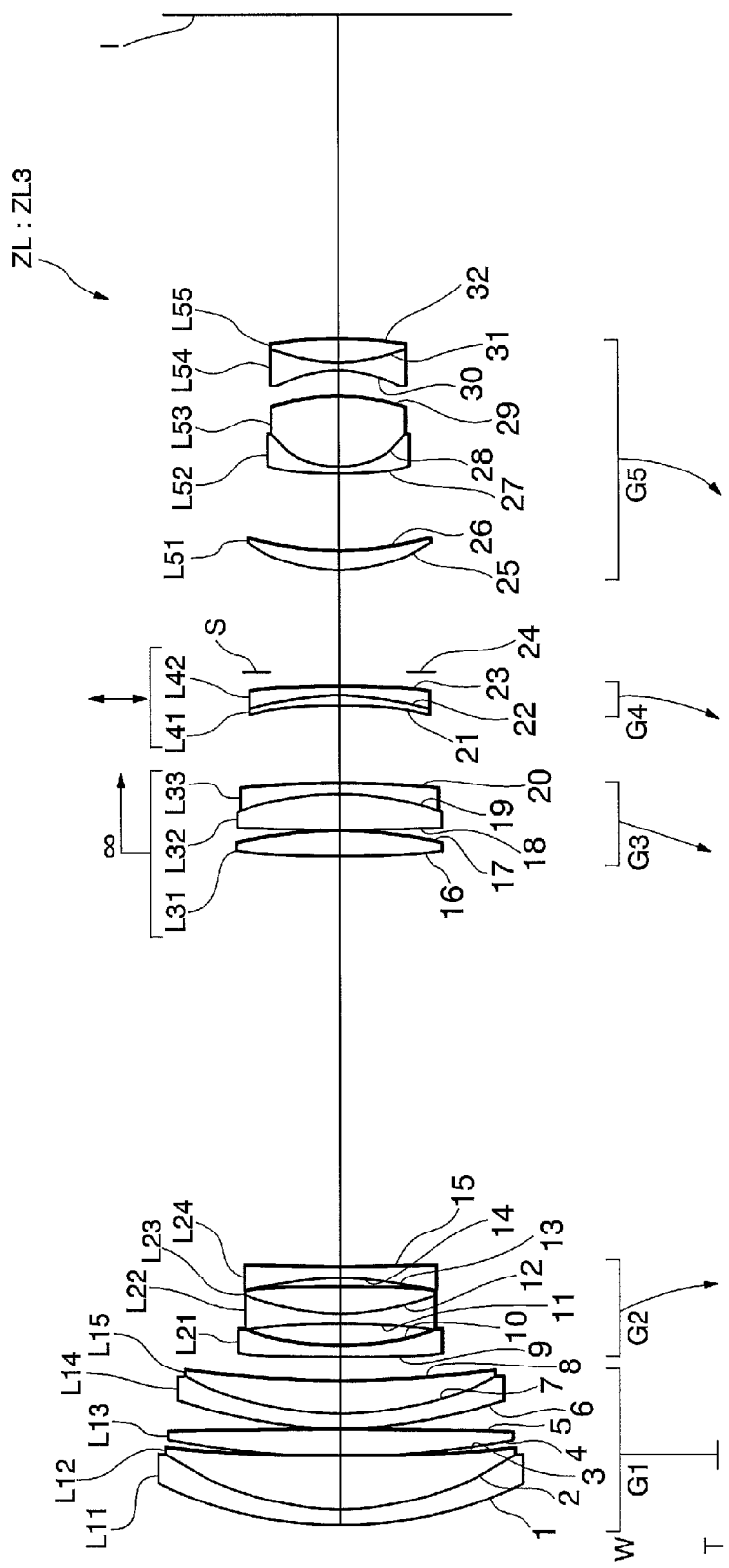

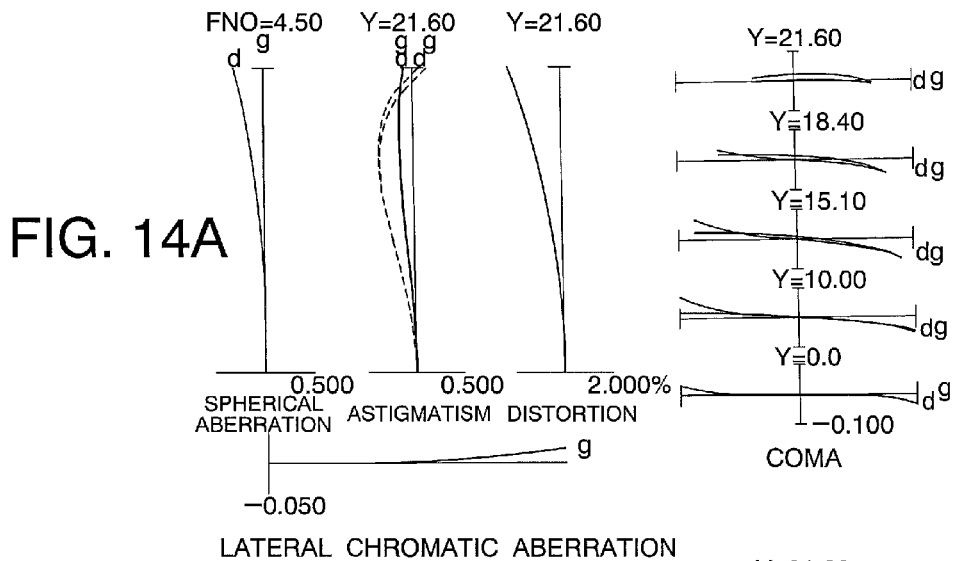
FIG. 14A
FIG. 14B
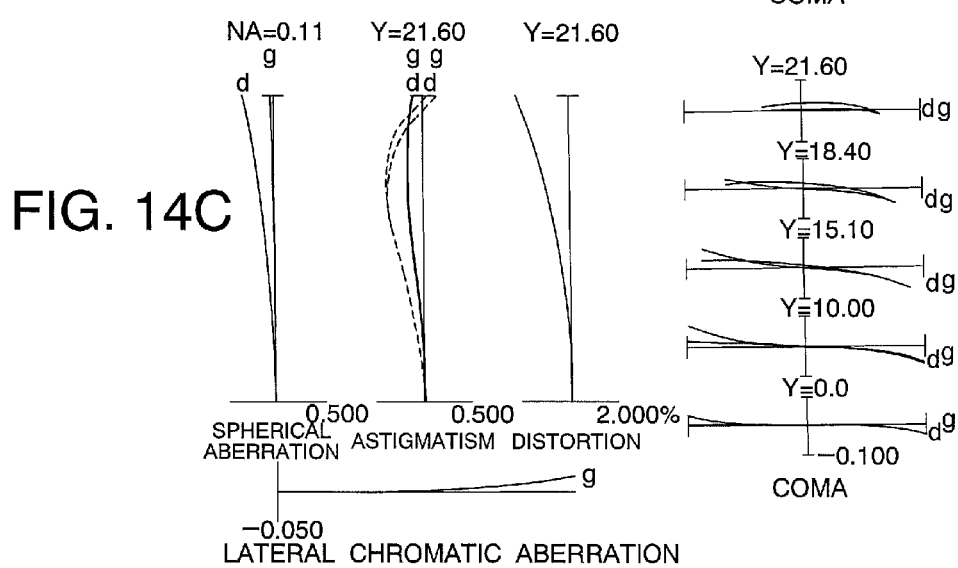
FIG. 14C

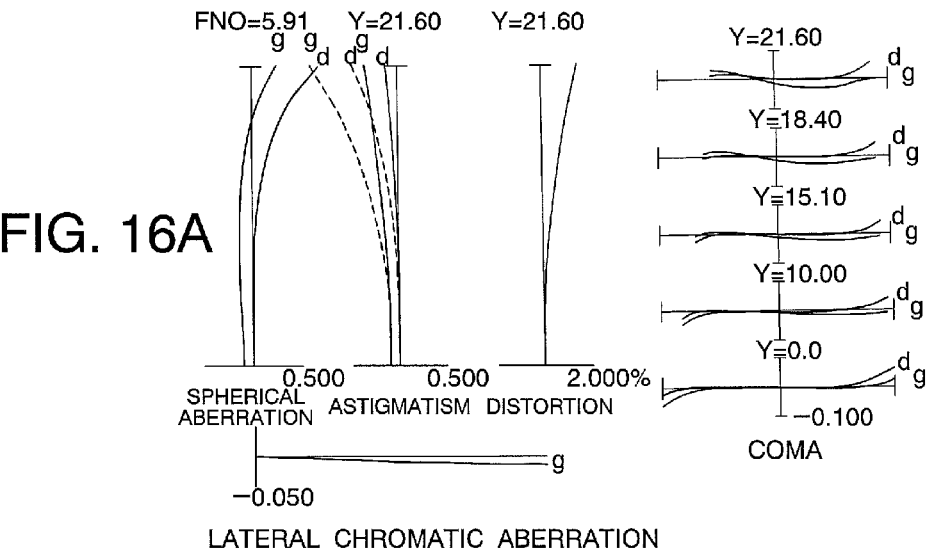
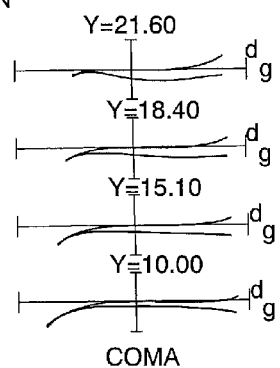
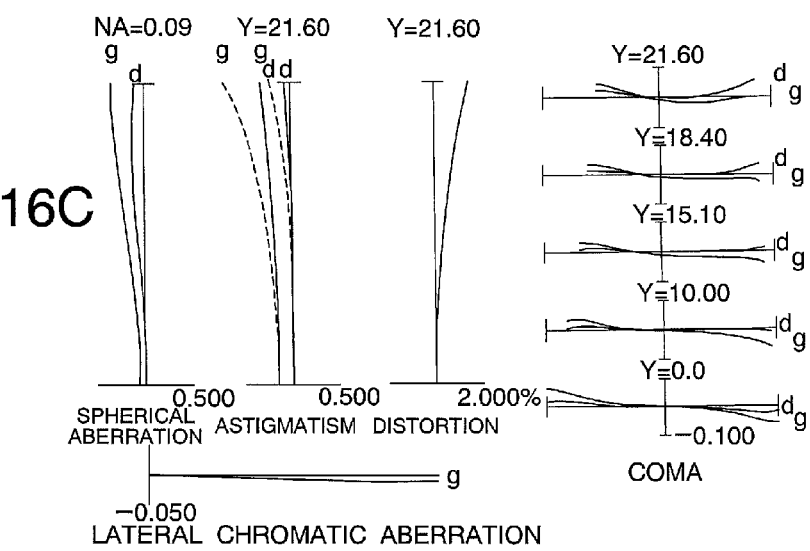

ZOOM LENS SYSTEM, OPTICAL APPARATUS, AND METHOD FOR MANUFACTURING ZOOM LENS SYSTEM

TECHNICAL FIELD

The present invention relates to a zoom lens system, an optical apparatus, and a method for manufacturing the zoom lens system.

BACKGROUND ART

There has been known a zoom lens system having high zoom ratio, for example, in Japanese Patent Application Laid-Open No. 2000-47107.

SUMMARY OF THE INVENTION

Problem to be Solved by the Invention

However, there has been a problem that a zoom lens system having a high zoom ratio can not attain excellent optical performance.

Means for Solving the Problem

The present invention is made in view of the above-described problem, and has an object to provide a zoom lens system that is capable of realizing excellent optical performance and has a high zoom ratio and also well-corrected aberrations.

According to a first aspect of the present invention, there is provided a zoom lens system comprising, in order from an object side: a first lens group having positive refractive power; a second lens group having negative refractive power; a third lens group having positive refractive power; a fourth lens group having negative refractive power; and a fifth lens group having positive refractive power; upon zooming the first lens group being fixed with respect to an image plane in the direction of the optical axis, and upon focusing at least a portion of the third lens group being moved along the optical axis, and the zoom lens system satisfying the following conditional expression (1):

$$0.010 < f1/f3 < 1.410 \qquad (1),$$

where f1 denotes a focal length of the first lens group, and f3 denotes a focal length of the third lens group.

In the first aspect of the present invention, it is preferable that the following conditional expression (2) is satisfied:

$$0.160 < f2/f4 < 0.370 \qquad (2),$$

where f2 denotes a focal length of the second lens group, and f4 denotes a focal length of the fourth lens group.

Further, in the first aspect of the present invention, it is preferable that the following conditional expression (3) is satisfied:

$$0.370 < f3/(-f4) < 0.620 \qquad (3),$$

where f3 denotes a focal length of the third lens group, and f4 denotes a focal length of the fourth lens group.

Furthermore, in the first aspect of the present invention, it is preferable that the following conditional expression (4) is satisfied:

$$1.140 < (-f4)/f5 < 1.540 \qquad (4),$$

where f4 denotes a focal length of the fourth lens group, and f5 denotes a focal length of the fifth lens group.

Further, in the first aspect of the present invention, it is preferable that at least a portion of the fourth lens group is moved in a direction including a component perpendicular to the optical axis.

Furthermore, in the first aspect of the present invention, it is preferable that, upon zooming, a distance between the first lens group and the second lens group is varied, a distance between the second lens group and the third lens group is varied, a distance between the third lens group and the fourth lens group is varied, and a distance between the fourth lens group and the fifth lens group is varied.

Further, in the first aspect of the present invention, it is preferable that all of the lens surfaces are spherical surfaces.

According to a second aspect of the present invention, there is provided an optical apparatus equipped with a zoom lens system according to the first aspect of the present invention.

According to a third aspect of the present invention, there is provided a method for manufacturing a zoom lens system which comprises, in order from an object side: a first lens group having positive refractive power; a second lens group having negative refractive power; a third lens group having positive refractive power; a fourth lens group having negative refractive power; and a fifth lens group having positive refractive power, the method comprising steps of disposing the lens groups so that, upon zooming, the first lens group is fixed with respect to an image plane in the direction of the optical axis; disposing the lens groups so that, upon focusing, at least a portion of the third lens group is moved along the optical axis, and disposing the lens groups so that the zoom lens system satisfies the following conditional expression (1):

$$0.010 < f1/f3 < 1.410 \qquad (1),$$

where f1 denotes a focal length of the first lens group, and f3 denotes a focal length of the third lens group.

Effect of the Invention

According to the present invention, there can be provided a zoom lens system, an optical apparatus, and a method for manufacturing the zoom lens system that is capable of realizing excellent optical performance and has a high zoom ratio and also well-corrected aberrations.

BRIEF DESCRIPTION OF THE DRAWINGS

FIG. 1 is a sectional view showing a zoom lens system according to the first Example of an embodiment.

FIGS. 2A, 2B and 2C are graphs showing various aberrations in a wide-angle end state of the zoom lens system according to a first Example of the embodiment, in which FIG. 2A shows various aberrations upon focusing on infinity, FIG. 2B shows coma at the time where correction of blurs is conducted upon focusing on infinity, and FIG. 2C shows various aberrations upon focusing on a close object (at which R=1.8 m, where R denotes a photo taking distance of the entire system).

FIGS. 3A and 3B are graphs showing various aberrations in an intermediate focal length state of a zoom lens system of the first Example, in which FIG. 3A shows various aberrations upon focusing on infinity, and FIG. 3B shows various aberrations upon focusing on a close object (at which R=1.8 m, where R denotes a photo taking distance R of the entire system).

FIGS. 4A, 4B and 4C are graphs showing various aberrations in a telephoto end state of the zoom lens system according to the first Example of the embodiment, in which FIG. 4A shows various aberrations upon focusing on infinity, FIG. 4B shows coma at the time where correction of blurs is conducted upon focusing on infinity, and FIG. 4C shows various aberrations upon focusing on a close object (at which R=1.8 m, where R denotes a photo taking distance of the entire system).

FIGS. 6A, 6B and 6C are graphs showing various aberrations in a wide-angle end state of the zoom lens system according to the second Example of the present embodiment, in which FIG. 6A shows various aberrations upon focusing on infinity, FIG. 6B shows coma at the time where correction of blurs is conducted upon focusing on infinity, and FIG. 6C shows various aberrations upon focusing on a close object (at which R=1.8 m, where R denotes a photo taking distance of the entire system).

FIGS. 7A and 7B are graphs showing various aberrations in an intermediate focal length state of a zoom lens system of the second Example, in which FIG. 7A shows various aberrations upon focusing on infinity, and FIG. 7B shows various aberrations upon focusing on a close object (at which R=1.8 m, where R denotes a photo taking distance of the entire system).

FIGS. 8A, 8B and 8C are graphs showing various aberrations in a telephoto end state of the zoom lens system according to the second Example, in which FIG. 8A shows various aberrations upon focusing on infinity, FIG. 8B shows coma at the time where correction of blurs is conducted upon focusing on infinity, and FIG. 8C shows various aberrations upon focusing on a close object (at which R=1.8 m, where R denotes a photo taking distance R of the entire system).

FIG. 9 is a sectional view showing a zoom lens system according to a third Example of the present embodiment.

FIGS. 10A, 10B and 10C are graphs showing various aberrations in a wide-angle end state of the zoom lens system according to the third Example of the present embodiment, in which FIG. 10A shows various aberrations upon focusing on infinity, FIG. 10B shows coma at the time where correction of blurs is conducted upon focusing on infinity, and FIG. 10C shows various aberrations upon focusing on a close object (at which R=1.8 m, where R denotes a photo taking distance of the entire system).

FIGS. 11A and 11B are graphs showing various aberrations in an intermediate focal length state of a zoom lens system of the third Example, in which FIG. 11A shows various aberrations upon focusing on infinity, and FIG. 11B shows various aberrations upon focusing on a close object (at which R=1.8 m, where R denotes a photo taking distance of the entire system).

FIGS. 12A, 12B and 12C are graphs showing various aberrations in a telephoto end state of the zoom lens system according to the third Example, in which FIG. 12A shows various aberrations upon focusing on infinity, FIG. 12B shows coma at the time where correction of blurs is conducted upon focusing on infinity, and FIG. 12C shows various aberrations upon focusing on a close object (at which R=1.8 m, where R denotes a photo taking distance R of the entire system).

FIGS. 14A, 14B and 14C are graphs showing various aberrations in a wide-angle end state of a zoom lens system of the fourth Example, in which FIG. 14A shows various aberrations upon focusing on infinity, FIG. 14B shows coma at the time where correction of blurs is conducted upon focusing on infinity, and FIG. 14C shows various aberrations upon focusing on a close object (at which R=1.8 m, where R denotes a photo taking distance of the entire system).

FIGS. 15A and 15B are graphs showing various aberrations in an intermediate focal length state of a zoom lens system of the fourth Example, in which FIG. 15A shows various aberrations upon focusing on infinity, and FIG. 15B shows various aberrations upon focusing on a close object (at which R=1.8 m, where R denotes a photo taking distance of the entire system).

FIGS. 16A, 16B and 16C are graphs showing various aberrations in a telephoto end state of the zoom lens system according to the fourth Example, in which FIG. 16A shows various aberrations upon focusing on infinity, FIG. 16B shows coma at the time where correction of blurs is conducted upon focusing on infinity, and FIG. 16C shows various aberrations upon focusing on a close object (at which R=1.8 m, where R denotes a photo taking distance R of the entire system).

EMBODIMENT FOR CARRYING OUT THE INVENTION

Figure 13:
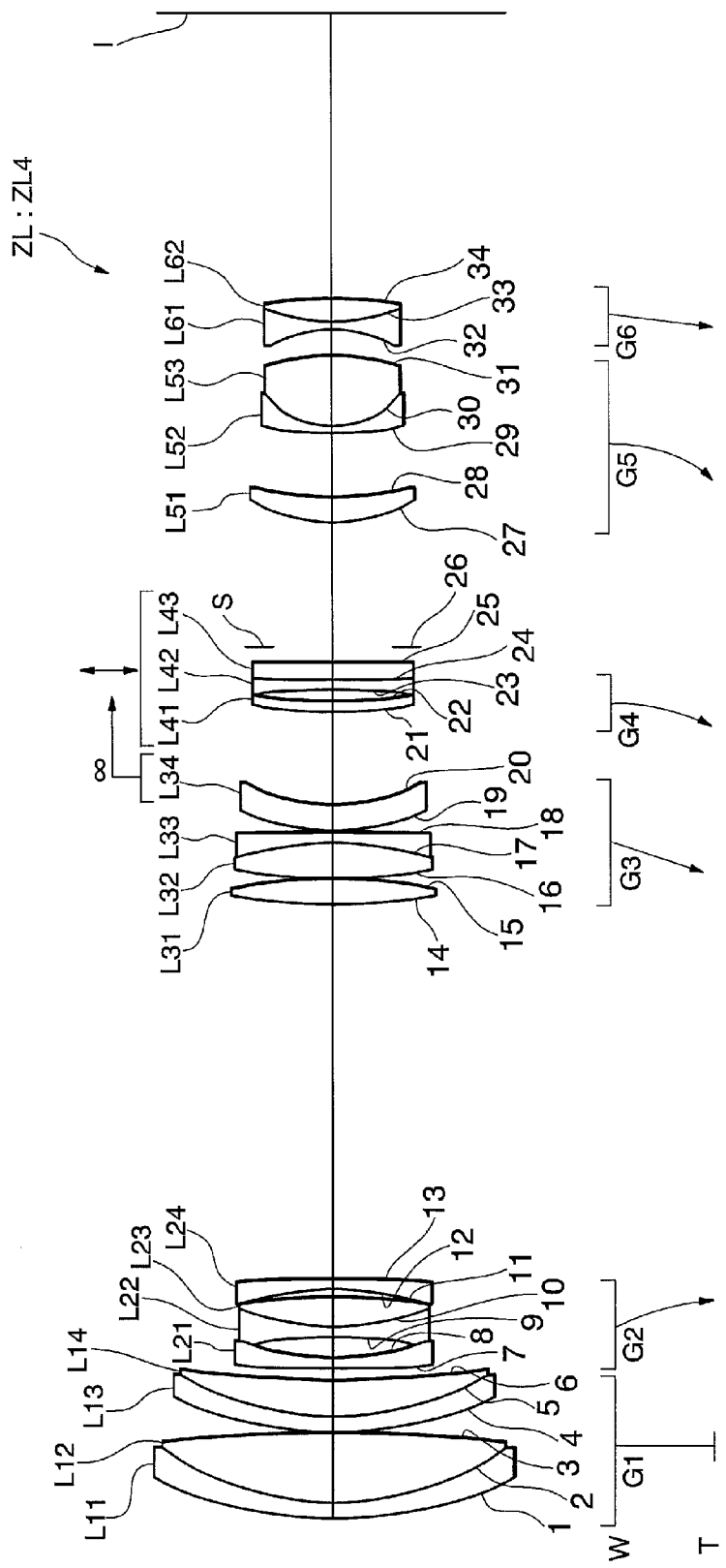
FIG. 13 is a sectional view showing a zoom lens system according to a fourth Example of the present embodiment.

A preferable embodiment according to the present invention is explained below with reference to accompanying drawings. As shown in FIG. 1, a zoom lens system ZL according to the present embodiment is composed of, in order from an object side, a first lens group G1 having positive refractive power; a second lens group G2 having negative refractive power; a third lens group G3 having positive refractive power; a fourth lens group G4 having negative refractive power; and a fifth lens group G5 having positive refractive power. In the zoom lens system ZL according to the present embodiment, upon zooming, the first lens group G1 is fixed with respect to an image plane in the direction of the optical axis, and upon focusing at least a portion of the third lens group G3 is moved along the optical axis. The zoom lens system ZL may be composed of six lens groups, as shown in FIG. 13.

The zoom lens system ZL according to the present embodiment is characterized in satisfying the following conditional expression (1):

$$0.010 < f1/f3 < 1.410 \qquad (1),$$

where f1 denotes a focal length of the first lens group G1, and f3 denotes a focal length of the third lens group G3.

The present zoom lens system ZL according to the embodiment is composed of 5 or more lens groups in its entirety, among which at least 4 lens groups are movable, thereby attaining a simplified structure. Such a simplified structure may easily suppress deteriorating of optical performance caused by decentering of any lens, and can realize a zoom lens system ZL having stable and excellent optical performance.

It is noted here that in the zoom lens system ZL according to the present embodiment the first lens group G1 is fixed upon zooming, thereby the center of gravity becomes hard to be varied, and the zoom lens system ZL may be easily handled. Moreover, by eliminating contact of the zoom lens system with exterior object due to falling down by the weight of the zoom lens system itself, or by reducing the number of movable lens groups, it is expected that the zoom lens system becomes stable in structure and strong against any shocks.

The third lens group G3 is small in size and light in weight in comparison with the first lens group G1. Due to such reason, at least a portion of the third lens group G3 is made to be movable along the optical axis as a focusing lens group and thereby high speed focusing may be made.

The conditional expression (1) defines a ratio of a focal length f1 of the first lens group G1 to a focal length f3 of the third lens group G3. The present zoom lens system ZL can realize excellent optical performance by satisfying the conditional expression (1). When the value of f1/f3 exceeds the upper limit value of the conditional expression (1), refractive power of the first lens group G1 becomes weak. Accordingly, it becomes difficult to make the curvature of field generated by the first lens group G1 sufficiently small, so that it is undesirable. In order to attain the advantageous effect of the present embodiment surely, it is preferable to set the upper limit value of the conditional expression (1) to 1.400.

On the other hand, when the value of f1/f3 falls below the lower limit value of the conditional expression (1), the curvature of the field is deteriorated, so that it is not preferable. In order to attain the advantageous effect of the present embodiment surely, it is preferable to set the lower limit value of the conditional expression (1) to 0.100. In order to attain the effect of the application more surely, it is preferable to set the lower limit value of the conditional expression (1) to 0.50. Moreover, in order to attain the effect of the present embodiment more surely, it is preferable to set the lower limit value to 1.00.

Further, it is preferable that the present zoom lens system ZL satisfies the following expression (2):

$$0.160 < f2/f4 < 0.370 \qquad (2),$$

where f2 denotes a focal length of the second lens group G2, and f4 denotes a focal length of the fourth lens group G4.

The conditional expression (2) defines a ratio of the focal length f2 of the second lens group G2 to the focal length f4 of the fourth lens group G4. The present zoom lens system ZL can realize excellent optical performance by satisfying the conditional expression (2).

When the value of f2/f4 falls below the lower limit value of the conditional expression (2), the refractive power of the second lens group G2 becomes strong, and it becomes difficult to make coma generated by the second lens group G2 sufficiently small, so that it is not preferable. In order to attain the effect of the present embodiment surely, it is preferable to set the lower limit value of the conditional expression (2) to 0.165.

On the other hand, when the value of f2/f4 exceeds the upper limit value of conditional expression (2), refractive power of the fourth lens group G4 becomes strong. Accordingly, it becomes difficult to make coma generated by the fourth lens group G4 sufficiently small, so that it is undesirable. In order to attain the effect of the present embodiment surely, it is preferable to set the upper limit value of the conditional expression (2) to 0.300.

It is preferable that the present zoom lens system ZL satisfies the following expression (3):

$$0.370 < f3/(-f4) < 0.620 \qquad (3),$$

where f3 denotes a focal length of the third lens group G3, and f4 denotes a focal length of the fourth lens group G4.

The following conditional expression (3) defines a ratio of the focal length f3 of the third lens group G3 to the focal length f4 of the fourth lens group G4. The present zoom lens system ZL can realize excellent optical performance by satisfying the conditional expression (3). When the value of f3/(-f4) falls below the lower limit value of the conditional expression (3), the refractive power of the third lens group G3 becomes strong. Accordingly it becomes difficult to make negative spherical aberration generated by the third lens group G3 sufficiently small, so it is not preferable. It is preferable to set the lower limit value of the conditional expression (3) to 0.380 in order to attain the effect of the present embodiment surely.

On the other hand, when the value of f3/(−f4) exceeds the upper limit value of the conditional expression (3), the refractive power of the fourth lens group G4 becomes strong. Accordingly, it becomes difficult to make the positive spherical aberration generated by the fourth lens group G4 sufficiently small, so that it is undesirable. In order to attain the advantageous effect of the present embodiment surely, it is preferable to set the upper limit value of the conditional expression (3) to 0.600.

Further, it is preferable that the present zoom lens system ZL satisfies the following expression (4):

$$1.140 < (-f4)/f5 < 1.540 \qquad (4),$$

where f4 denotes a focal length of the fourth lens group G4, and f5 denotes a focal length of the fifth lens group G5.

The conditional expression (4) defines a ratio of the focal length f4 of the fourth lens group G4 to the focal length f5 of the fifth lens group G5. The present zoom lens system ZL can realize excellent optical performance by satisfying the conditional expression (4).

When the value of (−f4)/f5 falls below the lower limit value of the conditional expression (4), the refractive power of the fourth lens group G4 becomes strong, and it becomes difficult to make the positive distortion generated by the fourth lens group G4 sufficiently small, so that it is not preferable. It is preferable to set the lower limit value to 1.200 in order to attain the effect of the present embodiment surely.

On the other hand, when the value of (−f4)/f5 exceeds the upper limit value of the conditional expression (4), the refractive power of the fifth lens group G5 becomes strong. Accordingly, it becomes difficult to make the negative distortion generated by the fifth lens group G5 sufficiently small, so that it is undesirable. In order to attain the advantageous effect of the present embodiment surely, it is preferable to set the upper limit value of the conditional expression (4) to 1.530.

Further, it is preferable that in the zoom lens system ZL according to the present embodiment, at least a portion of the fourth lens group G4 is moved in a direction including a component perpendicular to an optical axis. By such a feature, correction of image plane at the time when image blur is generated may be made, and excellent optical performance may be realized.

In the zoom lens system ZL according to the present embodiment, it is preferable that, upon zooming, each distance between the adjacent two of the first to fifth lens groups G1 to G5, is varied (in other words, a distance between the first lens group G1 and the second lens group G2 is varied, a distance between the second lens group G2 and the third lens group G3 is varied, a distance between the third lens group G3 and the fourth lens group G4 is varied, and a distance between the fourth lens group G4 and the fifth lens group G5 is varied).

According to this configuration, high zoom ratio can be secured, and aberrations upon zooming can be easily corrected.

In the zoom lens system ZL according to the present embodiment, it is preferable that all the lens surfaces are spherical surfaces. When the lens surfaces are spherical surfaces, processing and assembling of the lenses become easy, and deterioration in optical performances due to errors in processing, assembling and adjustment may be prevented. Even if image plane is shifted, imaging or optical performance is not deteriorated. This phenomenon is same even if some plane surface(s) is (are) included.

Figure 17:
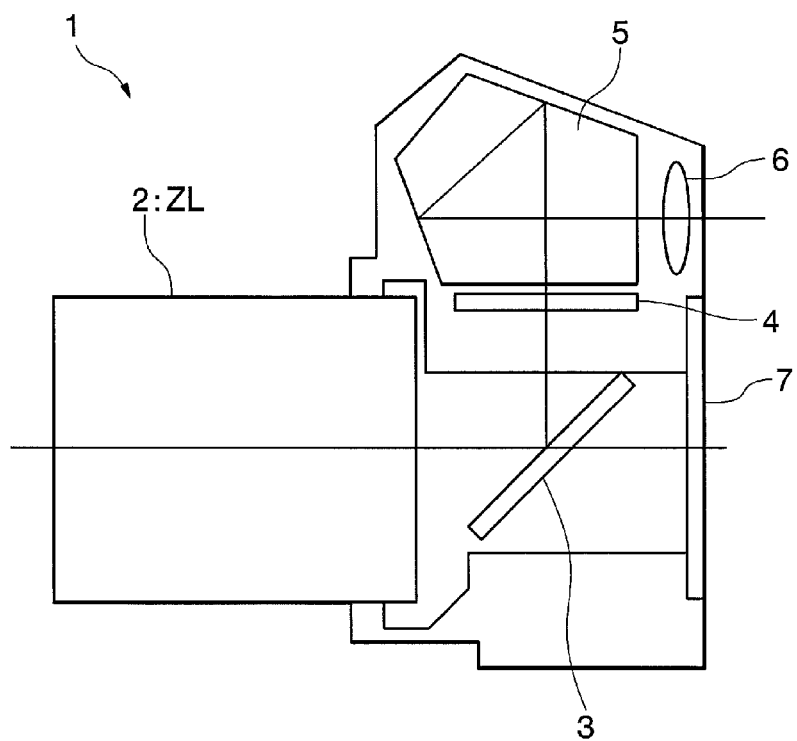
FIG. 17 is an explanatory view showing a cross section of a single lens reflex camera equipped with the zoom lens system according to the present embodiment.

FIG. 17 shows a schematic cross section of a single lens reflex camera 1 (hereinafter being abbreviated simply as "camera") equipped with the above described zoom lens system ZL. In this camera 1, light rays emitted from an unillustrated object (the object to be photographed) is converged by an imaging lens 2(that is, zoom lens system ZL) and focused on a focusing plate 4 through a quick return mirror 3. The light rays focused on the focusing plate 4 are reflected a plurality of times in a pentagonal roof prism 5 and led to an eyepiece 6, so that a photographer can observe an erected image of the object (the object to be photographed) through the eyepiece lens 6.

When the photographer presses an unillustrated release button, the quick return mirror 3 is retracted out from the optical path, and the light rays from the unillustrated object (the object to be photographed) converged by the imaging lens 2 form an object image (an image of the object) on an imaging device 7. Accordingly the light rays from the object are captured by the imaging device 7 and stored in an unillustrated memory as a photographed image of the object (the object to be photographed). In this manner, the photographer can take a picture of an object (an object to be photographed) by the camera 1. Incidentally, the camera 1 shown in FIG. 17 may be constructed to hold removably the zoom lens system ZL or also may be constructed integrally with the zoom lens system ZL. Moreover, the camera 1 may be constructed as a so-called single lens reflex camera. Even the camera is of a type which is not equipped with a quick return mirror, the same effects as those attained by the above described camera may be attained.

Figure 18:
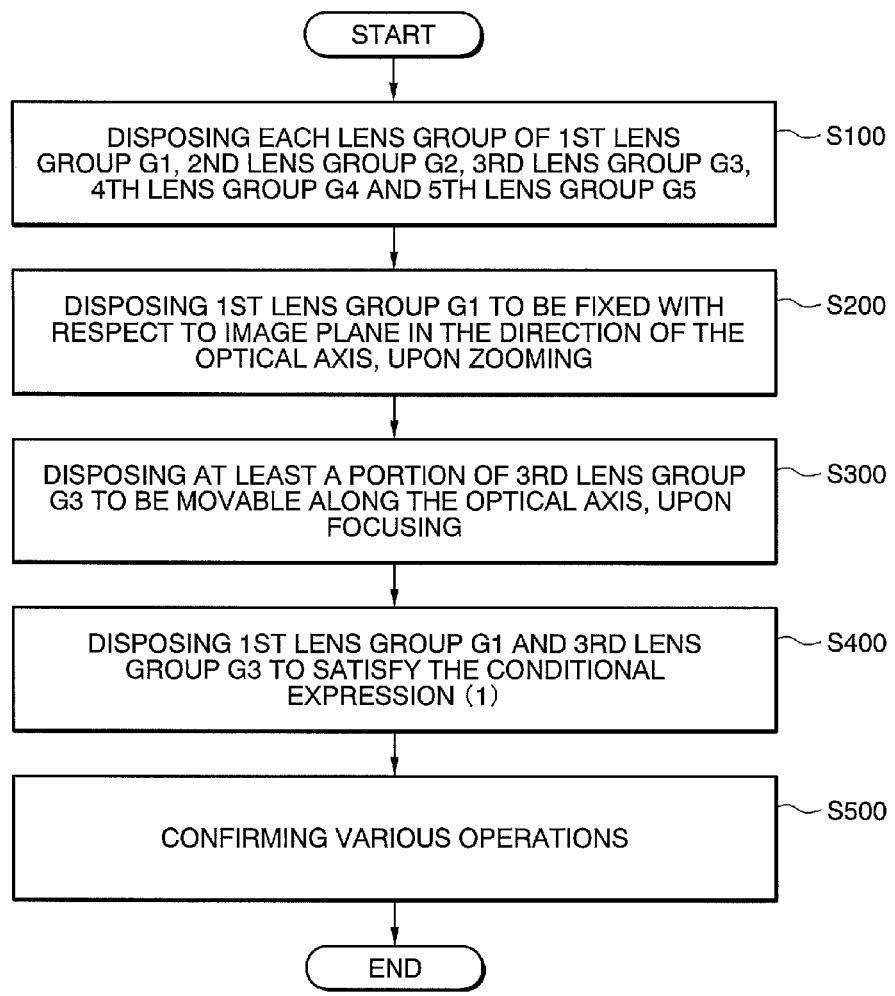
FIG. 18 is a flowchart schematically explaining a method for manufacturing the zoom lens system according to the present embodiment.

Hereinafter, an outline of a method for manufacturing a zoom lens system ZL according the present embodiment is explained with reference to FIG. 18.

(Step 100) At first, in a cylindrical lens barrel, each lens is disposed to prepare each lens group. Concretely, according to the present embodiment, as shown in FIG. 1, for example, in order from an object side, a cemented lens constructed by a negative meniscus lens L11 having a convex surface facing the object side cemented with a double convex lens L12, and a cemented lens constructed by a negative meniscus lens L13 having a convex surface facing the object side cemented with a positive meniscus lens L14 having a convex surface facing the object side are arranged to form a first lens group G1; in order from the object side, a negative meniscus lens L21 having a convex surface facing the object side, a cemented lens constructed by a double concave lens L22 cemented with a double convex lens L23, and a negative meniscus lens L24 having a concave surface facing the object side are arranged to form a second lens group G2; in order from the object side, a double convex lens L31, a cemented lens constructed by a double convex lens L32 cemented with a negative meniscus lens L33 having a concave surface facing the objective side, and a negative meniscus lens L34 having a convex surface facing the object side are arranged to form a third lens group G3; a positive meniscus lens L41 having a convex surface facing the object side and a cemented lens constructed by a double concave lens L42 cemented with a positive meniscus lens L43 having a convex surface facing the object side are arranged to form a fourth lens group G4; an aperture stop S is disposed at the image side of the fourth lens group G4; and at the image side of the aperture stop S, in order from the object side, a positive meniscus lens L51 having a convex surface facing the object side, a cemented lens constructed by a negative meniscus lens L52 having a convex surface facing the object side cemented with a double convex lens L53, and a cemented lens constructed by a double concave lens L54 cemented with a double convex lens L55 are arranged to form a fifth lens group G5.

(Step 200) At this time, the arrangement is so made that the first lens group G1 is fixed with respect to the image plane in the direction of the optical axis upon zooming.

(Step 300) The arrangement is so made that at least a portion of the third lens group G3 is moved along the optical axis upon focusing.

(Step 400) The arrangement is so made that these lens groups G1 to G5 satisfy the above conditional expression (1), where f1 denotes a focal length of the first lens group G1, and f3 denotes a focal length of the third lens group G3.

Incidentally, upon assembling the lenses into the lens barrel, each lens may be assembled one by one in order along the optical axis, or some or all of the lenses may be first held in a holding member together and then assembled with the lens barrel.

(Step 500) After each lens has been assembled in the lens barrel as described above, confirmation is conducted as to whether an image of an object may be formed in the state where each lens is assembled in the lens barrel, that is, whether the centers of the lenses are aligned correctly. Next, confirmations are made for various operations of the zoom lens system, such as, a zooming operation for zooming from a wide angle end state to a telephoto end state (for example, the first lens group G1, the second lens group G2, the third lens group G3, the fourth lens group G4 and the fifth lens group G5 shown in FIG. 1 are respectively moved along the optical axis.), focusing operation in which a focusing lens for focusing on from an infinite distant object point to a close distant object point (for example, the third lens group G3 shown in FIG. 1) is moved in the direction of the optical axis, an operation for correcting an image blur caused by a camera shake in which operation at least a portion of the lens system (for example, the fourth lens group G4 shown in FIG. 1) is moved in a direction having a component perpendicular to the optical axis. Incidentally, the various confirming operations may be made in any order.

As above described, there can be provided a zoom lens system ZL that has excellent optical performances and is suitable for a photographing camera, an electric still camera, a video camera or the like and has an excellently corrected chromatic aberration, and an optical apparatus (for example, camera 1) equipped with the zoom lens system ZL.

EXAMPLES

Next, each example of the present application is explained with reference to the accompanying drawings. FIG. 1, FIG. 5, FIG. 9 and FIG. 13 show cross-sections of the respective zoom lens systems ZL (ZL1 to ZL4) as the examples of the present application. Arrows occurred under the cross sectional views of the respective zoom lens systems ZL (ZL1 to ZL4) show direction of movement of each of the lens groups G1 to G5 (or G6) along the optical axis upon zooming from the wide angle end state (W) to the telephoto end state (T). (The first lens group G1 is fixed with respect to the image plane in the direction of the optical axis upon zooming.)

First Example

FIG. 1 shows a lens configuration of the zoom lens system ZL1 according to the first example and a zooming trajectory thereof. As shown in FIG. 1, the zoom lens system ZL1 according to the first example comprises, in order from the object side along the optical axis, a first lens group G1 having positive refractive power; a second lens group G2 having negative refractive power; a third lens group G3 having positive refractive power; a fourth lens group G4 having negative refractive power; and a fifth lens group G5 having positive refractive power.

The first lens group G1 comprises, in order from an object side along the optical axis, a cemented lens constructed by a negative meniscus lens L11 having a convex surface facing the object side cemented with a double convex lens L12, and a cemented lens constructed by a negative meniscus lens L13 having a convex surface facing an object side cemented with a positive meniscus lens L14 having a convex surface facing the object side.

The second lens group G2 comprises, in order from the object side along the optical axis, a negative meniscus lens L21 having a convex surface facing the object side, a cemented lens constructed by a double concave lens L22 cemented with a double convex lens L23, and a negative meniscus lens L24 having a concave surface facing the object side.

The third lens group G3 comprises, in order from the object side along the optical axis, a double convex lens L31, a cemented lens constructed by a double convex lens L32 cemented with a negative meniscus lens L33 having a concave surface facing the object side, and a negative meniscus lens L34 having a convex surface facing the object side.

The fourth lens group G4 comprises, in order from the object side, a positive meniscus lens L41 having a convex surface facing the object side and a cemented lens constructed by a double concave lens L42 and a positive meniscus lens L43 having a convex surface facing the object side.

The fifth lens group G5 comprises, in order from the object side along the optical axis, a positive meniscus lens L51 having a convex surface facing the object side, a cemented lens constructed by a negative meniscus lens L52 having a convex surface facing the object side cemented with a double convex lens L53, and a cemented lens constructed by a double concave lens L54 cemented with a double convex lens L55.

In the zoom lens system ZL1 having such a configuration according to the present embodiment, it is preferable that, upon zooming from the wide angle end state to the telephoto end state, the second to the fifth lens groups G2 to G5 are moved such that a distance between the first lens group G1 and the second lens group G2 is increased, a distance between the second lens group G2 and the third lens group G3 is decreased, a distance between the third lens group G3 and the fourth lens group G4 is varied, and a distance between the fourth lens group G4 and the fifth lens group G5 is decreased. However, upon zooming from the wide angle end state to the telephoto end state, the first lens group G1 is fixed in the direction of the optical axis with respect to the image plane I.

The aperture stop S is disposed between the fourth lens group G4 and the fifth lens group G5 and is moved together with the fourth lens group G4 upon zooming from the wide angle end state to the telephoto end state.

In the zoom lens system ZL1 according to the first example, the third lens group G3 is moved from the object side to the image side along the optical axis, upon focusing on an infinitely distant object point to a close object point.

Incidentally, in the zoom lens system ZL1 according to the first example, the negative meniscus lens L41 and the cemented lens constructed by the double concaved lens L42 cemented with the positive meniscus lens L43 are made to be a lens group for reducing vibration. This vibration reducing lens group is shifted in the direction perpendicular to the optical axis to carry out correction of the image plane at the time when camera shake is generated. It is enough for the vibration reducing lens group to be moved in the direction perpendicular to the optical axis by (f·tan θ)/K in order to correct rotational shake of an angle θ of the lens system whose focal length of the entire system is f and in which a blur correction coefficient that is a ratio of shift amount of the image on the image plane I to movement amount of the vibration reducing lens group in the direction of the optical axis is K.

In the wide angle end state of the first example, blur correction coefficient K is −0.785, and the focal length is 81.6 (mm). Accordingly, amount of movement of the vibration reduction lens for correcting rotational shake of 0.350° is −0.635 (mm). In the telephoto end state of the first example, the blur correction coefficient is −1.234, and the focal length is 392 (mm), so the vibration reducing lens is required to be moved by −0.885 (mm) in order to correct rotational shake of 0.160°.

Various values associated with the zoom lens system ZL1 according to the first example are listed in Table 1 below.

In (Specifications) of Table 1, W denotes a wide-angle end state, M denotes an intermediate focal length state, T denotes a telephoto end state, f denotes a focal length of the entire zoom lens system, FNO denotes an f-number, TL denotes a total lens length of the entire system (that is, a distance along the optical axis from the first lens surface of the lens surfaces upon focusing on infinity to an image plane I), 2ω denotes a full angle of view, and φ denotes the diameter of the aperture stop.

In (Lens Data), the first column m shows order of lens surface (lens surface number) from the object side along the direction in which light rays advance, the second column r shows radius of curvature of each lens surface, the third column d shows a distance along the optical axis from a lens surface to the next lens surface or image plane I (surface-to-surface distance), the fourth column nd shows refractive index of the material at d-line (wave length=587.6 nm), and the fifth column νd shows Abbe-number of the material at d-line. Incidentally, surface numbers 1 to 34 shown in Table 1 correspond to surfaces 1 to 34, respectively, shown in FIG. 1.

In (Lens Group Data), a starting surface ST and focal length of each of the first to fifth lens groups G1 to G5 are shown.

In (Variable Distance Data), INF shows a focused state on an infinitely distant object point, CLD shows a focused state on a closely distant object point (at which R=1.8 m, where R denotes a photographing distance of the entire system). D0 denotes a distance along the optical axis from the vertex of the most object side lens surface to the object.

In (Values for Conditional Expressions), values for respective conditional expressions are shown.

In the following all various values, "mm" is generally used for the unit of length such as the focal length f, the radius of curvature r and the distance d from a surface to the next lens surface. However, since similar optical performance can be obtained by an optical system proportionally enlarged or reduced its dimension, the unit is not necessarily to be limited to "mm", and any other suitable unit can be used. Radius of curvature 0.0000 shows a plane in the case of lens surface and shows an aperture or stop surface in the case of an aperture stop. Refractive index 1.00000 of air is omitted. The explanations of these reference signs and the explanations of various values in the Table are the same in the examples below.

TABLE 1

(Various Values)

|  | W | M | T |
|---|---|---|---|
| f = | 81.6 | 200.0 | 392.0 |
| FNO = | 4.6 | 4.9 | 5.8 |
| TL = | 300.0 | 300.0 | 300.0 |
| 2ω = | 30.3 | 12.1 | 6.2 |
| Φ = | 25.2 | 28.0 | 32.0 |

TABLE 1-continued (Lens Data)

| m | r | d | nd | vd |
|---|---|---|---|---|
| 1 | 90.3626 | 3.3 | 1.79952 | 42.1 |
| 2 | 64.4126 | 13.7 | 1.49782 | 82.6 |
| 3 | −323.4131 | 0.2 | | |
| 4 | 90.0991 | 3.0 | 1.84666 | 23.8 |
| 5 | 66.7633 | 6.9 | 1.59319 | 67.9 |
| 6 | 221.4083 | D1 | | |
| 7 | 289.4442 | 2.0 | 1.77250 | 49.6 |
| 8 | 54.5420 | 4.4 | | |
| 9 | −85.1025 | 2.0 | 1.75500 | 52.3 |
| 10 | 56.3666 | 5.6 | 1.80809 | 22.7 |
| 11 | −157.5631 | 1.9 | | |
| 12 | −63.3615 | 2.0 | 1.81600 | 46.6 |
| 13 | −303.6297 | D2 | | |
| 14 | 136.0550 | 4.7 | 1.72000 | 43.6 |
| 15 | −119.9075 | 0.2 | | |
| 16 | 128.5528 | 7.0 | 1.60300 | 65.4 |
| 17 | −76.6023 | 2.0 | 1.84666 | 23.8 |
| 18 | −1425.8055 | 0.4 | | |
| 19 | 53.8121 | 5.0 | 1.59319 | 67.9 |
| 20 | 43.5920 | D3 | | |
| 21 | 90.8618 | 2.0 | 1.83400 | 37.2 |
| 22 | 94.8728 | 2.6 | | |
| 23 | −116.9535 | 1.8 | 1.77250 | 49.6 |
| 24 | 287.3742 | 3.5 | 1.84666 | 23.8 |
| 25 | 844.7596 | 3.3 | | |
| 26 | 0.0000 | D4 | Aperture stop S | |
| 27 | 33.3813 | 4.9 | 1.80400 | 46.6 |
| 28 | 70.0018 | 13.3 | | |
| 29 | 65.7975 | 1.3 | 1.68893 | 31.2 |
| 30 | 18.9846 | 14.0 | 1.48749 | 70.3 |
| 31 | −54.3746 | 5.2 | | |
| 32 | −30.2199 | 1.5 | 1.81600 | 46.6 |
| 33 | 39.6615 | 4.5 | 1.80518 | 25.5 |
| 34 | −96.7465 | BF | | |

(Lens Group Data)

| Lens Group | ST | focusing distance |
|---|---|---|
| G1 | 1 | 114.4955 |
| G2 | 7 | −39.0000 |
| G3 | 14 | 82.4344 |
| G4 | 21 | −146.9238 |
| G5 | 27 | 110.8862 |

(Variable Distance Data)

| | W | M | T |
|---|---|---|---|
| | | INF | |
| f = | 81.6 | 200.0 | 392.0 |
| D0 = | ∞ | ∞ | ∞ |
| D1 = | 2.3136 | 25.2531 | 34.1938 |
| D2 = | 74.5443 | 34.7297 | 2.0000 |
| D3 = | 15.6961 | 31.1663 | 29.4377 |
| D4 = | 25.6497 | 10.4793 | 2.0000 |
| BF = | 59.4758 | 76.0510 | 110.0483 |
| | | CLD | |
| β = | −0.04 | −0.10 | −0.17 |
| D0 = | 1500 | 1500 | 1500 |
| D1 = | 2.3136 | 25.2531 | 34.1938 |
| D2 = | 86.9877 | 52.0579 | 27.6034 |
| D3 = | 3.2527 | 13.8381 | 3.8343 |
| D4 = | 25.6497 | 10.4793 | 2.0000 |
| BF = | 59.4758 | 76.0510 | 110.0483 |

(Value for Conditional Expressions)

(1) f1/f3 = 1.389
(2) f2/f4 = 0.265
(3) f3/(−f4) = 0.561
(4) (−f4)/f5 = 1.325

FIGS. 2A, 2B and 2C are graphs showing aberrations of the zoom lens system according to the first Example in a wide angle end state, in which FIG. 2A shows various aberrations upon focusing on infinity, FIG. 2B shows coma upon carrying out correction of blur upon focusing on infinity, and FIG. 2C shows various aberrations upon focusing on a close distant object (where a photographing distance R of the entire system is 1.8 m (R=1.8 m).

Figure 3A:
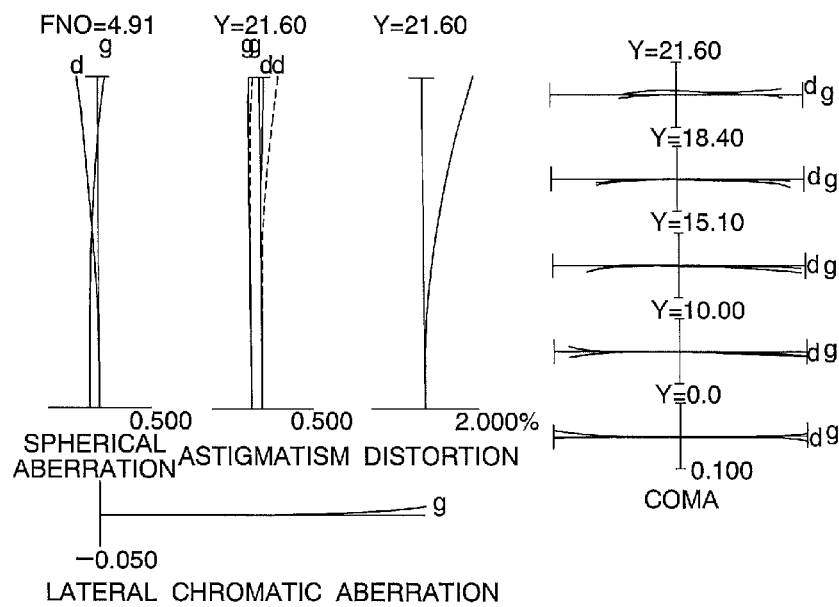
Figure 3B:
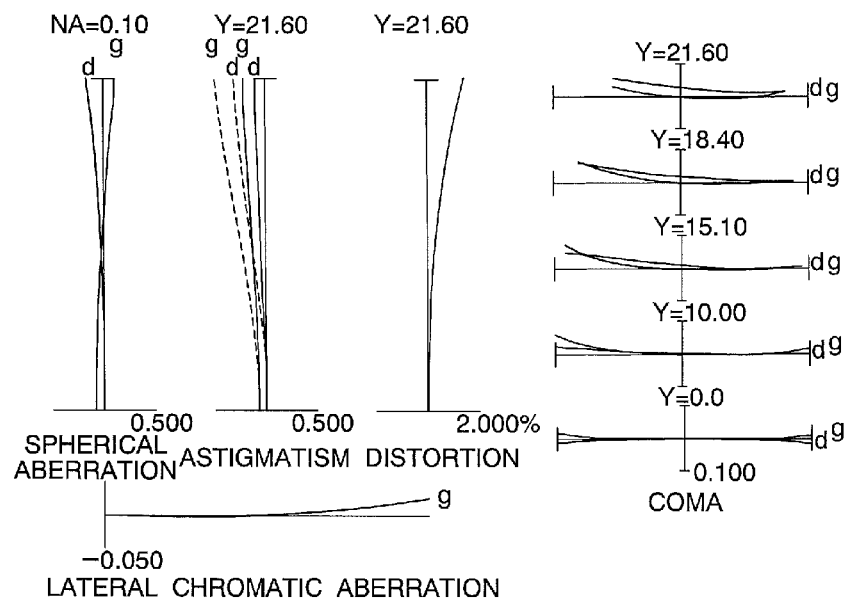

FIGS. 3A and 3B are graphs showing aberrations of the zoom lens system according to the first Example in an intermediate focal length state, in which FIG. 3A shows various aberrations upon focusing on infinity and FIG. 3B shows various aberrations upon focusing on a close distant object (where a photographing distance R of the entire system is 1.8 m (R=1.8 m)).

FIGS. 4A, 4B and 4C are graphs showing aberrations of the zoom lens system in a telephoto end state according to the first Example, in which FIG. 4A shows various aberrations upon focusing on infinity, FIG. 4B shows coma upon carrying out correction of blur upon focusing on infinity, and FIG. 4C shows various aberrations upon focusing on a close distant object (where a photographing distance R of the entire system is 1.8 m (R=1.8 m)).

In each diagram having various aberrations, FNO denotes an f-number, NA denotes numerical aperture, Y denotes an image height (unit: mm), d indicates an aberration curve with respect to d-line (wave length=587.6 nm), g indicates an aberration curve with respect to the g-line (wave length=435.8 nm), and an aberration curve without being specified shows an aberration with respect to d-line. In respective graphs showing spherical aberrations, values of f-numbers corresponding to maximum apertures are shown. In respective graphs showing astigmatism and distortions, the maximum values of the image height are respectively shown, and in graphs showing coma each image height value is shown. In graphs showing astigmatism, a solid line indicates a sagittal image plane, and a broken line indicates a meridional image plane. Note that the descriptions of these aberration diagrams are the same with the subsequent Examples.

As is apparent from the respective graphs showing aberrations, the zoom lens system according to the first Example shows superb optical performance as a result of good corrections to various aberrations from the wide-angle end state to the telephoto end state.

Second Example

Figure 5:
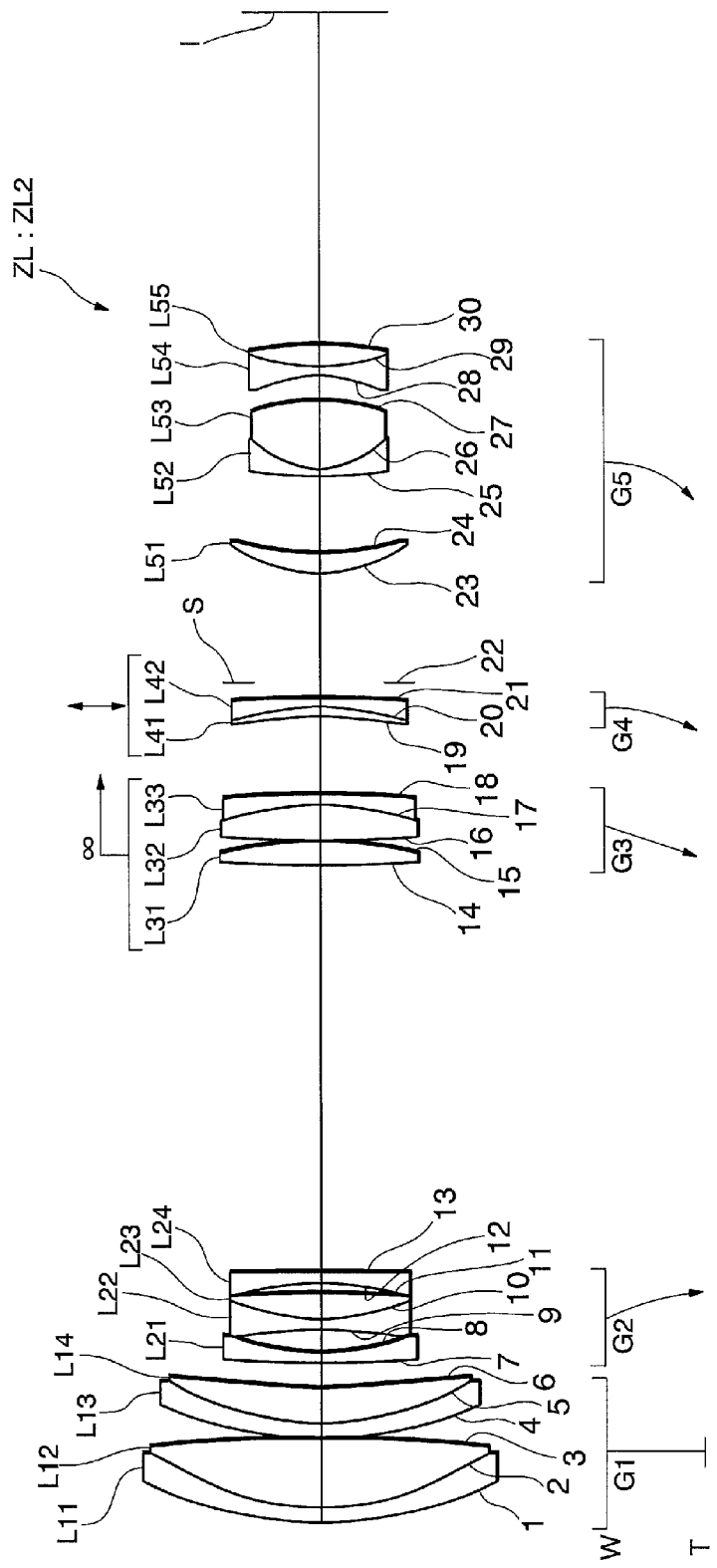
FIG. 5 is a sectional view showing a zoom lens system according to a second Example of the present embodiment.

FIG. 5 shows a lens configuration of the zoom lens system ZL2 according to the second Example and a zooming trajectory thereof. As shown in FIG. 5, the zoom lens system ZL2 according to the second example comprises, in order from the object side along the optical axis, a first lens group G1 having positive refractive power; a second lens group G2 having negative refractive power; a third lens group G3 having positive refractive power; a fourth lens group G4 having negative refractive power; and a fifth lens group G5 having positive refractive power.

The first lens group G1 comprises, in order from an object along the optical axis, a cemented lens constructed by a negative meniscus lens L11 having a convex surface facing the object side cemented with a double convex lens L12, and a cemented lens constructed by a negative meniscus lens L13 having convex surface facing an object side cemented with a positive meniscus lens L14 having a convex surface facing the object side.

The second lens group G2 comprises, in order from the object side along the optical axis, a negative meniscus lens L21 having a convex surface facing the object side, a cemented lens constructed by a double concave lens L22 cemented with a double convex lens L23, and a double concave lens L24.

The third lens group G3 comprises, in order from the object along the optical axis, a double convex lens L31, and a cemented lens constructed by a double convex lens L32 cemented with a negative meniscus lens L33 having a concave surface facing the object side.

The fourth lens group G4 comprises, in order from the object side, a cemented lens constructed by a positive meniscus lens L41 having a concave surface facing the object side cemented with a negative meniscus lens L42 having a concave surface facing the object side.

The fifth lens group G5 comprises, in order from the object side along the optical axis, a positive meniscus lens L51 having a convex surface facing the object side, a cemented lens constructed by a negative meniscus lens L52 having a convex surface facing the object side cemented with a double convex positive lens L53, and a cemented lens constructed by a double concave lens L54 cemented with a double convex lens L55.

In the zoom lens system ZL2 having such a configuration according to the present second example, it is preferable that, upon zooming from the wide angle end state to the telephoto end state, each lens group is moved such that a distance between the first lens group G1 and the second lens group G2 is increased, a distance between the second lens group G2 and the third lens group G3 is decreased, a distance between the third lens group G3 and the fourth lens group G4 is varied, and a distance between the fourth lens group G4 and the fifth lens group G5 is decreased. Note that, upon zooming from the wide angle end state to the telephoto end state, the first lens group G1 is fixed in the direction of the optical axis with respect to the image plane I.

The aperture stop S is disposed between the fourth lens group G4 and the fifth lens group G5 and is moved together with the fourth lens group G4 upon zooming from the wide angle end state to the telephoto end state.

In the zoom lens system ZL2 according to the second example, the third lens group G3 is moved from the object side to the image side along the optical axis, upon focusing on from an infinitely distant object point to a close object point.

Incidentally, in the zoom lens system ZL2 according to the second example, the cemented lens constructed by the positive meniscus lens L41 cemented with the negative meniscus lens L42 are made to be a lens group for reducing vibration. This vibration reducing lens group is shifted in the direction perpendicular to the optical axis to carry out correction of the image plane at the time when camera shake is generated.

In the wide angle end state of the second Example, blur correction coefficient K is −0.638, and the focal length is 81.6 (mm). Accordingly, amount of movement of the vibration reduction lens for correcting rotational shake of 0.350° is −0.781 (mm). In the telephoto end state of the second Example, the blur correction coefficient is −0.973, and the focal length is 392 (mm), so the vibration reducing lens is required to be moved by −1.122 (mm) in order to correct rotational shake of 0.160°.

Various values associated with the zoom lens system ZL2 according to the second Example are listed in Table 2 below. Incidentally, surface numbers 1 to 30 shown in Table 2 correspond to surfaces 1 to 30 shown in FIG. 5.

(Various Values)

|  | W | M | T |
|---|---|---|---|
| f = | 81.6 | 200.0 | 392.0 |
| FNO = | 4.6 | 4.8 | 5.8 |
| TL = | 300.0 | 300.0 | 300.0 |
| 2ω = | 30.6 | 12.1 | 6.2 |
| Φ = | 28.6 | 32.0 | 35.2 |

(Lens Data)

| m | r | d | nd | νd |
|---|---|---|---|---|
| 1 | 88.3109 | 3.3 | 1.79952 | 42.1 |
| 2 | 64.9396 | 13.3 | 1.49782 | 82.6 |
| 3 | −396.6101 | 0.1 | | |
| 4 | 91.4065 | 3.0 | 1.84666 | 23.8 |
| 5 | 67.3855 | 6.9 | 1.59319 | 67.9 |
| 6 | 226.2386 | D1 | | |
| 7 | 289.4312 | 2.0 | 1.77250 | 49.6 |
| 8 | 59.5668 | 4.4 | | |
| 9 | −109.2759 | 2.0 | 1.75500 | 52.3 |
| 10 | 53.9405 | 5.4 | 1.80809 | 22.7 |
| 11 | −193.3459 | 1.9 | | |
| 12 | −68.1720 | 2.0 | 1.81600 | 46.6 |
| 13 | 3004.7073 | D2 | | |
| 14 | 272.5667 | 4.7 | 1.72000 | 43.6 |
| 15 | −97.9868 | 0.2 | | |
| 16 | 349.4350 | 7.0 | 1.60300 | 65.4 |
| 17 | −70.7966 | 2.0 | 1.84666 | 23.8 |
| 18 | −296.8721 | D3 | | |
| 19 | −100.9730 | 2.0 | 1.83400 | 37.2 |
| 20 | −66.4844 | 1.8 | 1.77250 | 49.6 |
| 21 | −319.2856 | 3.0 | | |
| 22 | 0.0000 | D4 | Aperture stop S | |
| 23 | 33.4163 | 4.0 | 1.80400 | 46.6 |
| 24 | 69.6041 | 15.3 | | |
| 25 | 87.7229 | 1.3 | 1.68893 | 31.2 |
| 26 | 19.0435 | 14.0 | 1.48749 | 70.3 |
| 27 | −54.4058 | 5.3 | | |
| 28 | −31.0254 | 1.5 | 1.81600 | 46.6 |
| 29 | 37.8341 | 4.5 | 1.80518 | 25.5 |
| 30 | −92.5488 | BF | | |

(Lens Group Data)

| Lens Group | ST | focusing distance |
|---|---|---|
| G1 | 1 | 115.4964 |
| G2 | 7 | −39.0000 |
| G3 | 14 | 90.3722 |
| G4 | 19 | −205.4648 |
| G5 | 23 | 139.0895 |

(Variable Distance Data)

|  | W | M | T |
|---|---|---|---|
| | | INF | |
| f | 81.6 | 200.0 | 392.0 |
| D0 | ∞ | ∞ | ∞ |
| D1 | 4.9581 | 26.3218 | 34.9568 |
| D2 | 80.4033 | 37.3598 | 2.0000 |
| D3 | 15.8892 | 34.3003 | 30.3362 |
| D4 | 21.3886 | 7.0919 | 2.0000 |
| BF | 66.4915 | 84.0567 | 119.8377 |
| | | CLD | |
| β | −0.04 | −0.10 | −0.17 |
| D0 | 1500 | 1500 | 1500 |
| D1 | 4.9581 | 26.3218 | 34.9568 |
| D2 | 92.8179 | 55.0105 | 28.4573 |
| D3 | 3.4746 | 16.6496 | 3.8789 |
| D4 | 21.3886 | 7.0919 | 2.0000 |
| BF | 66.4916 | 84.0571 | 119.8389 |

-continued (Value for Conditional Expressions)

(1) f1/f3 = 1.278
(2) f2/f4 = 0.190
(3) f3/(−f4) = 0.440
(4) (−f4)/f5 = 1.477

Figure 6A:
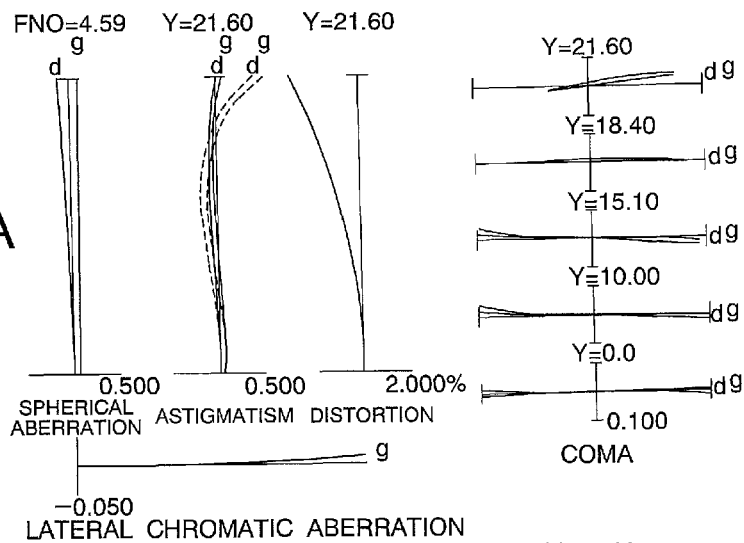
Figure 6B:
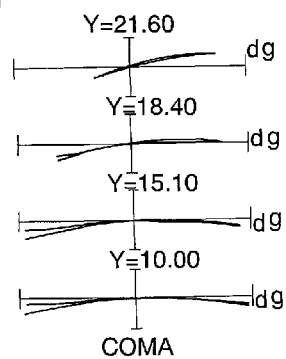
Figure 6C:
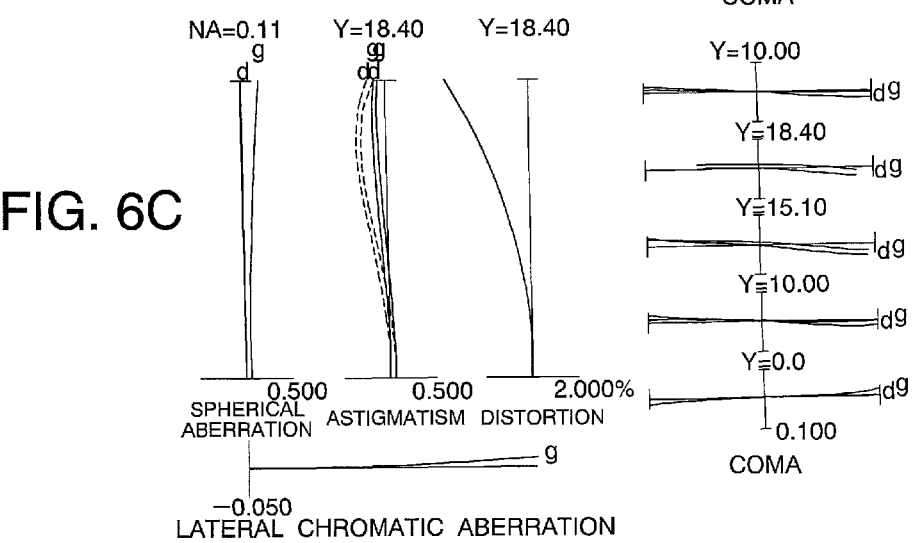

FIGS. 6A, 6B and 6C are graphs showing aberrations of the zoom lens system according to the second Example in a wide angle end state, in which FIG. 6A shows various aberrations upon focusing on infinity, FIG. 6B shows coma upon carrying out correction of blur upon focusing infinity, and FIG. 6C shows various aberrations upon focusing on a close distant object (where a photographing distance R of the entire system is 1.8 m (R=1.8 m)).

Figure 7A:
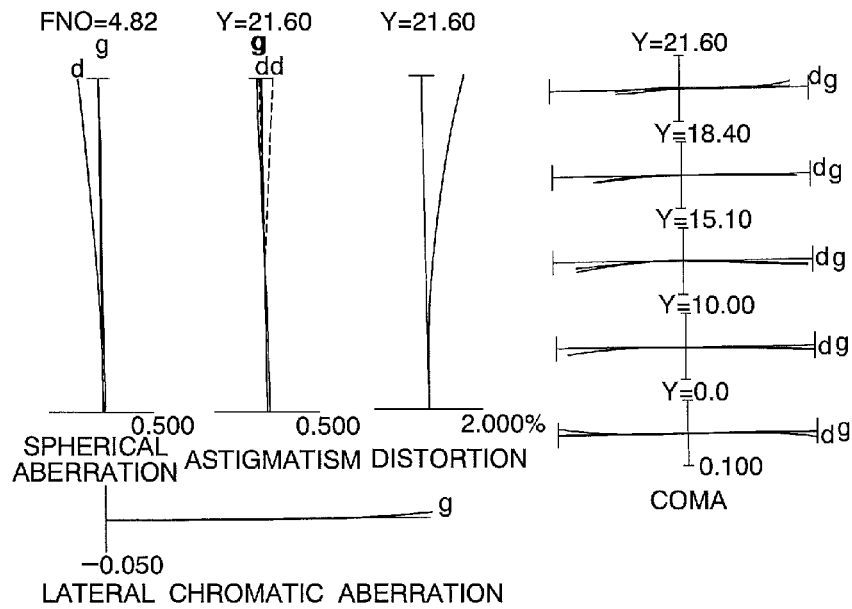
Figure 7B:
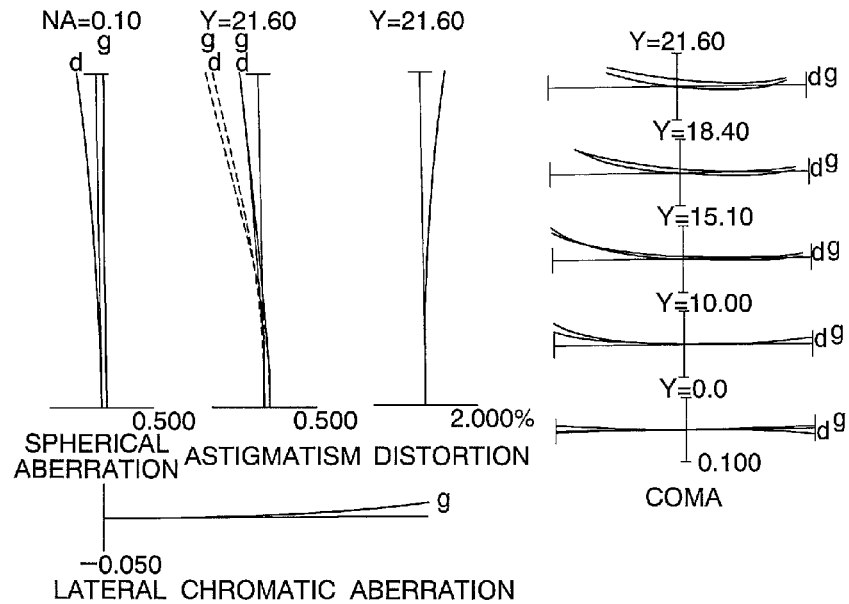

FIGS. 7A and 7B are graphs showing aberrations of the zoom lens system according to the second Example in an intermediate focal length state, in which FIG. 7A shows various aberrations upon focusing infinity and FIG. 7B shows various aberrations upon focusing on a close distant object (where a photographing distance R of the entire system is 1.8 m (R=1.8 m)).

Figure 8A:
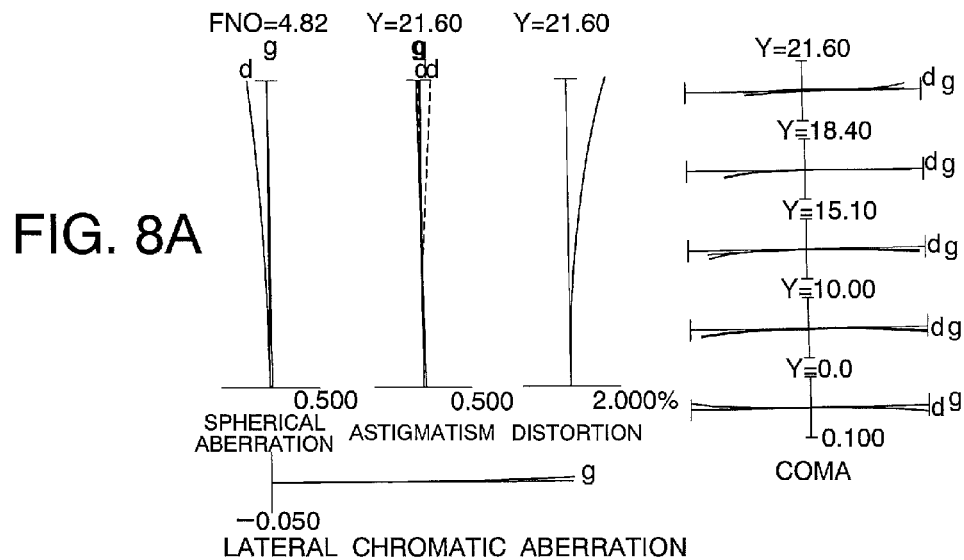
Figure 8B:
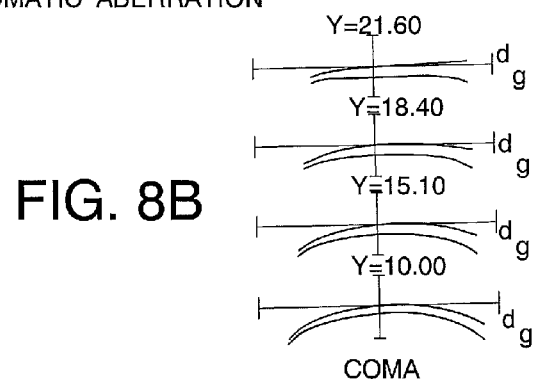
Figure 8C:
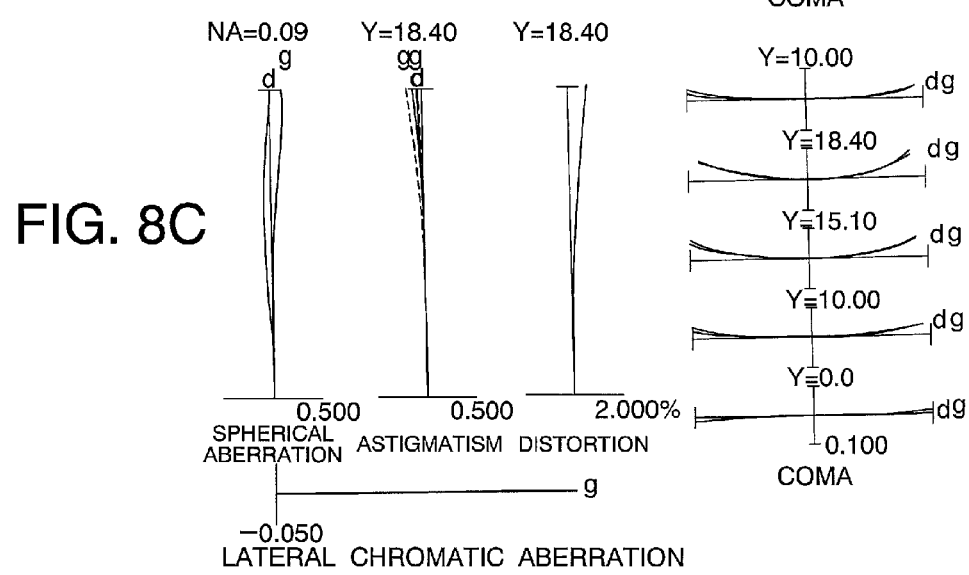

FIGS. 8A, 8B and 8C are graphs showing aberrations of the zoom lens system according to the second Example in a telephoto end state, in which FIG. 8A shows various aberrations upon focusing infinity, FIG. 8B shows coma upon carrying out correction of blur upon focusing on infinity, and FIG. 8C shows various aberrations upon focusing on a close distant object (where a photographing distance R of the entire system is 1.8 m (R=1.8 m)).

As is apparent from the respective graphs showing aberrations, the zoom lens system according to the second example shows superb optical performance as a result of good corrections to various aberrations from the wide-angle end state to the telephoto end state.

Third Example

FIG. 9 shows a lens configuration of the zoom lens system ZL3 according to the third example and a zooming trajectory thereof. As shown in FIG. 9, the zoom lens system ZL3 according to the third Example comprises, in order from the object side along the optical axis, a first lens group G1 having positive refractive power; a second lens group G2 having negative refractive power; a third lens group G3 having positive refractive power; a fourth lens group G4 having negative refractive power; and a fifth lens group G5 having positive refractive power.

The first lens group G1 comprises, in order from an object side along the optical axis, a cemented lens constructed by a negative meniscus lens L11 having a convex surface facing the object side cemented with a positive meniscus lens L12 having a convex surface facing the object side, a double convex lens L13 and a cemented lens constructed by a negative meniscus lens L14 having convex surface facing an object side cemented with a positive meniscus lens L15 having a convex surface facing the object side.

The second lens group G2 comprises, in order from the object side along the optical axis, a negative meniscus lens L21 having a convex surface facing the object side, a cemented lens constructed by a double concave lens L22 cemented with a double convex lens L23, and a double concave lens L24.

The third lens group G3 comprises, in order from the object side along the optical axis, a double convex lens L31, and a cemented lens constructed by a double convex lens L32 cemented with a negative meniscus lens L33 having a concave surface facing the object side.

The fourth lens group G4 comprises, in order from the object side, a cemented lens constructed by a positive meniscus lens L41 having a concave surface facing the object side and a negative meniscus lens L42 having a concave surface facing the object side.

The fifth lens group G5 comprises, in order from the object side along the optical axis, a positive meniscus lens L51 having a convex surface facing the object side, a cemented lens constructed by a negative meniscus lens L52 having a convex surface facing the object side cemented with a double convex lens L53, and a cemented lens constructed by a double concave lens L54 cemented with a double convex lens L55.

In the zoom lens system ZL3 having such a configuration according to the present third Example, upon zooming from the wide angle end state to the telephoto end state, each lens group is moved such that a distance between the first lens group G1 and the second lens group G2 is increased, a distance between the second lens group G2 and the third lens group G3 is decreased, a distance between the third lens group G3 and the fourth lens group G4 is varied, and a distance between the fourth lens group G4 and the fifth lens group G5 is decreased. Note that, upon zooming from the wide angle end state to the telephoto end state, the first lens group G1 is fixed in the direction of the optical axis with respect to the image plane I.

The aperture stop S is disposed between the fourth lens group G4 and the fifth lens group G5 and is moved together with the fourth lens group G4 upon zooming from the wide angle end state to the telephoto end state.

In the zoom lens system ZL3 according to the third example, the third lens group G3 is moved from the object side to the image side along the optical axis, upon focusing on from an infinitely distant object to a close object.

Incidentally, in the zoom lens system ZL3 according to the third Example, the cemented lens constructed by the positive meniscus lens L41 cemented with the negative meniscus lens L42 is made to be a lens group for reducing vibration. This vibration reducing lens group is shifted in the direction perpendicular to the optical axis to carry out correction of the image plane at the time when camera shake is generated.

In the wide angle end state of the third example, blur correction coefficient K is −0.571, and the focal length is 81.6 (mm). Accordingly, amount of movement of the vibration reduction lens for correcting rotational shake of 0.350° is −0.872 (mm). In the telephoto end state of the third example, the blur correction coefficient is −0.870, and the focal length is 392 (mm), so the vibration reducing lens is required to be moved by −1.256 (mm) in order to correct rotational shake of 0.160°.

Various values associated with the zoom lens system ZL3 according to the third example are listed in Table 3 below. Incidentally, surface numbers 1 to 32 shown in Table 7 correspond to surfaces 1 to 32 shown in FIG. 9.

TABLE 3

(Various Values)

| | W | M | T |
|---|---|---|---|
| f = | 81.6 | 200.0 | 392.0 |
| FNO = | 4.6 | 4.8 | 5.8 |
| TL = | 300.0 | 300.0 | 300.0 |
| 2ω = | 30.6 | 12.1 | 6.2 |
| Φ = | 28.6 | 32.0 | 35.2 |

TABLE 3-continued (Lens Data)

| m | r | d | nd | vd |
|---|---|---|---|---|
| 1 | 88.8502 | 3.3 | 1.79952 | 42.1 |
| 2 | 65.7614 | 10.3 | 1.49782 | 82.6 |
| 3 | 461.9657 | 0.1 | | |
| 4 | 219.2034 | 5.0 | 1.49782 | 82.6 |
| 5 | −682.7306 | 0.1 | | |
| 6 | 100.7146 | 3.0 | 1.84666 | 23.8 |
| 7 | 72.6863 | 6.3 | 1.59319 | 67.9 |
| 8 | 223.1238 | D1 | | |
| 9 | 454.6325 | 2.0 | 1.77250 | 49.6 |
| 10 | 62.1215 | 4.4 | | |
| 11 | −116.1137 | 2.0 | 1.75500 | 52.3 |
| 12 | 54.3078 | 5.3 | 1.80809 | 22.7 |
| 13 | −199.2381 | 1.9 | | |
| 14 | −68.8551 | 2.0 | 1.81600 | 46.6 |
| 15 | 4047.5114 | D2 | | |
| 16 | 265.9300 | 4.7 | 1.72000 | 43.6 |
| 17 | −98.1908 | 0.2 | | |
| 18 | 496.8226 | 7.0 | 1.60300 | 65.4 |
| 19 | −68.7179 | 2.0 | 1.84666 | 23.8 |
| 20 | −256.9321 | D3 | | |
| 21 | −97.1763 | 2.0 | 1.83400 | 37.2 |
| 22 | −66.4692 | 1.8 | 1.77250 | 49.6 |
| 23 | −236.7733 | 3.0 | | |
| 24 | 0.0000 | D4 | Aperture stop S | |
| 25 | 33.0102 | 4.0 | 1.80400 | 46.6 |
| 26 | 66.4615 | 15.4 | | |
| 27 | 89.2303 | 1.3 | 1.68893 | 31.2 |
| 28 | 18.9449 | 14.0 | 1.48749 | 70.3 |
| 29 | −52.5904 | 5.2 | | |
| 30 | −30.8360 | 1.5 | 1.81600 | 46.6 |
| 31 | 36.0629 | 4.7 | 1.80518 | 25.5 |
| 32 | −97.4474 | BF | | |

(Lens Group Data)

| Lens Group | ST | focusing distance |
|---|---|---|
| G1 | 1 | 115.3571 |
| G2 | 9 | −39.0000 |
| G3 | 16 | 91.5440 |
| G4 | 21 | −230.9495 |
| G5 | 25 | 151.0655 |

(Variable Distance Data)

| | W | M | T |
|---|---|---|---|
| | | INF | |
| f | 81.6 | 200.0 | 392.0 |
| D0 | ∞ | ∞ | ∞ |
| D1 | 5.0373 | 26.0405 | 34.5903 |
| D2 | 81.4597 | 37.7472 | 2.0000 |
| D3 | 15.7565 | 34.4194 | 30.5155 |
| D4 | 20.3376 | 6.4059 | 2.0000 |
| BF | 65.0107 | 82.9888 | 118.4960 |
| | | CLD | |
| β | −0.04 | −0.10 | −0.17 |
| D0 | 1500 | 1500 | 1500 |
| D1 | 5.0373 | 26.0405 | 34.5903 |
| D2 | 93.9050 | 55.4470 | 28.6351 |
| D3 | 3.3112 | 16.7195 | 3.8804 |
| D4 | 20.3376 | 6.4059 | 2.0000 |
| BF | 65.0107 | 82.9888 | 118.4960 |

(Value for Conditional Expressions)

(1) f1/f3 = 1.260
(2) f2/f4 = 0.169
(3) f3/(−f4) = 0.396
(4) (−f4)/f5 = 1.529

Figure 10A:
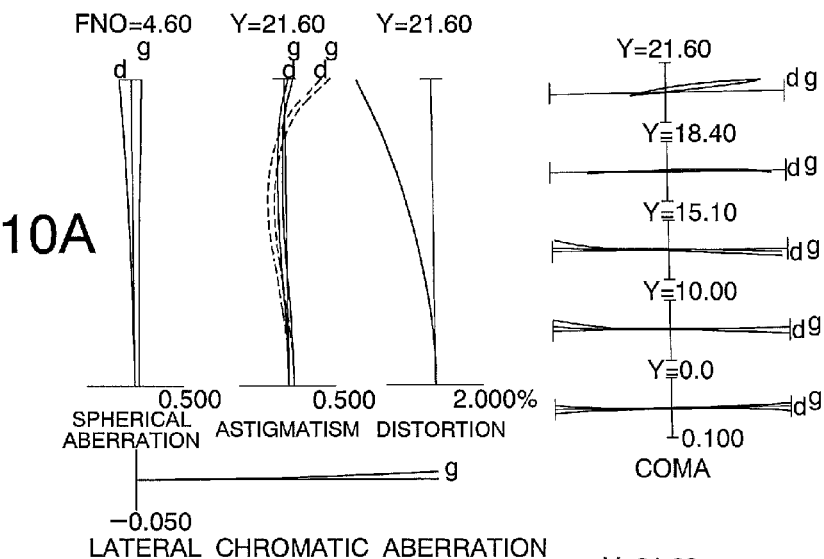
Figure 10B:
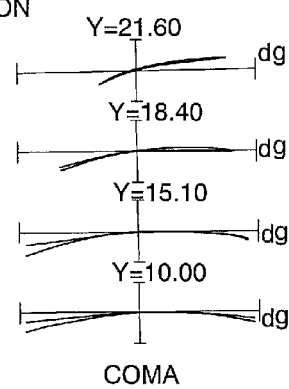
Figure 10C:
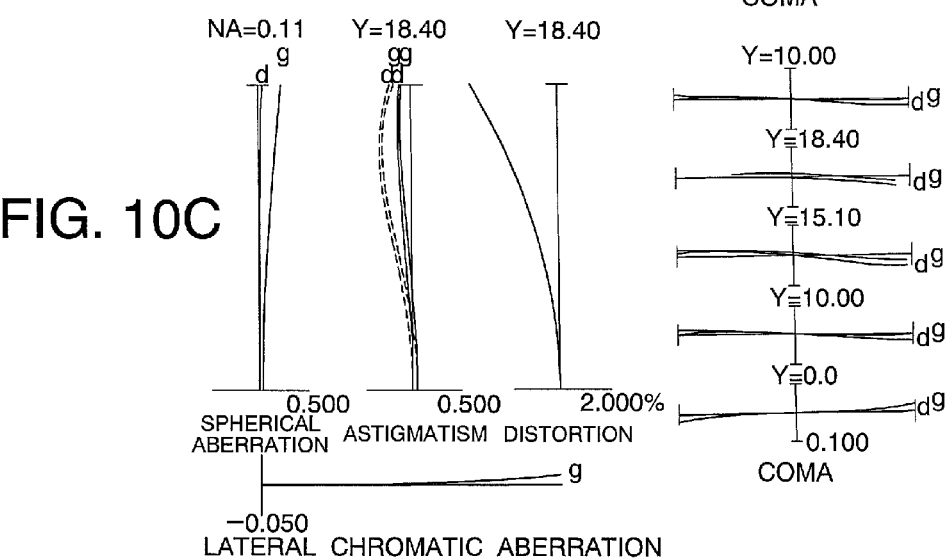

FIGS. 10A, 10B and 10C are graphs showing aberrations of the zoom lens system according to the third Example in a wide angle end state, in which FIG. 10A shows various aberrations upon focusing on infinity, FIG. 10B shows coma upon carrying out correction of blur upon focusing infinity, and FIG. 10C shows various aberrations upon focusing on a close distant object (where a photographing distance R of the entire system is 1.8 m (R=1.8 m)).

Figure 11A:
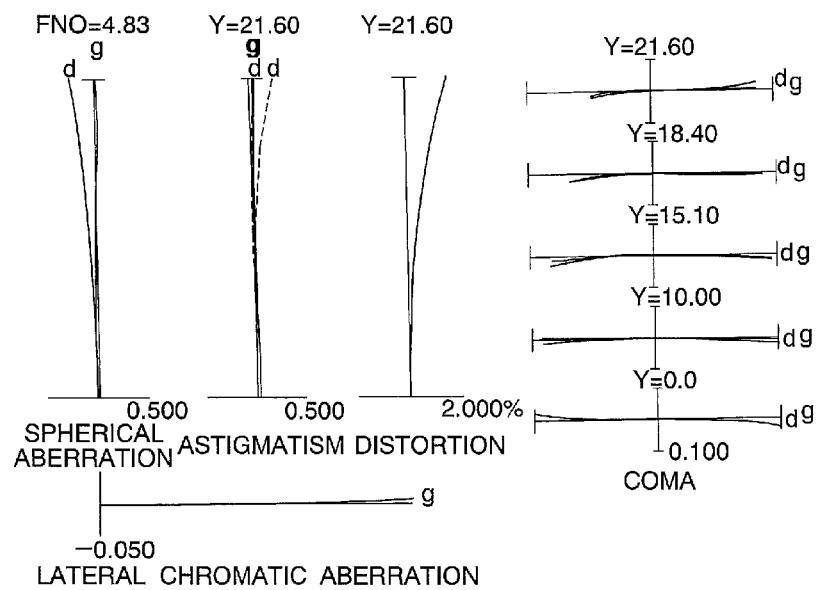
Figure 11B:
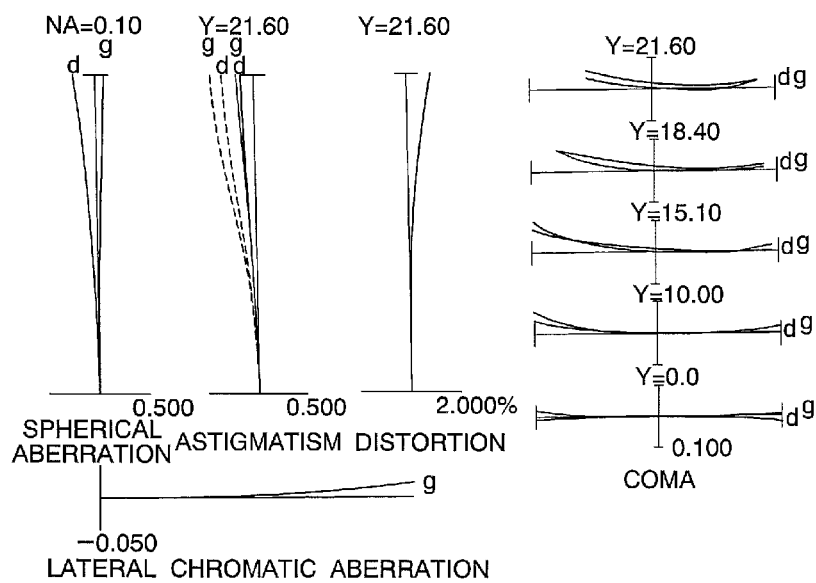

FIGS. 11A and 11B are graphs showing aberrations of the zoom lens system according to the third Example in an intermediate focal length state, in which FIG. 11A shows various aberrations upon focusing infinity and FIG. 11B shows various aberrations upon focusing on a close distant object (where a photographing distance R of the entire system is 1.8 m (R=1.8 m)).

Figure 12A:
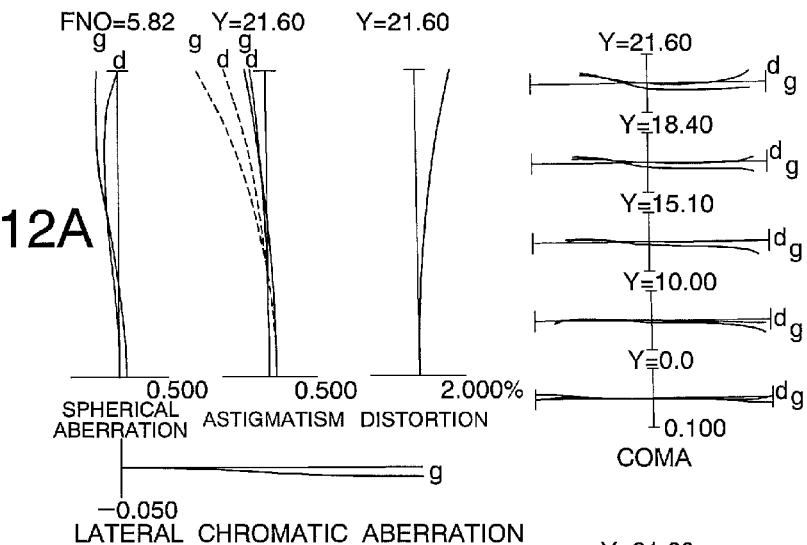
Figure 12B:
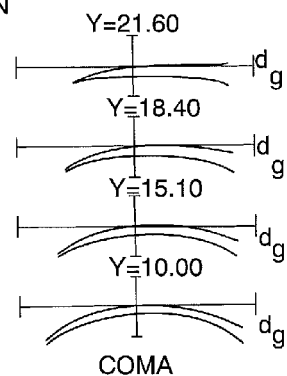
Figure 12C:
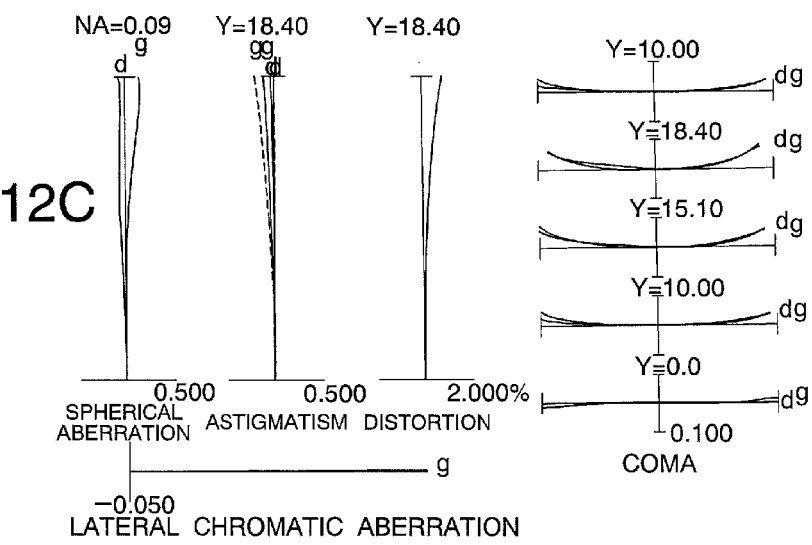

FIGS. 12A, 12B and 12C are graphs showing aberrations of the zoom lens system according to the third Example in a telephoto end state, in which FIG. 12A shows various aberrations upon focusing infinity, FIG. 12B shows coma upon carrying out correction of blur upon focusing on infinity, and FIG. 12C shows various aberrations upon focusing on a close distant object (where a photographing distance R of the entire system is 1.8 m (R=1.8 m)).

As is apparent from the respective graphs showing aberrations, the zoom lens system according to the third example shows superb optical performance as a result of good corrections to various aberrations from the wide-angle end state to the telephoto end state.

Fourth Example

FIG. 13 shows a lens configuration of the zoom lens system ZL4 according to the fourth example and a zooming trajectory thereof. As shown in FIG. 13, the zoom lens system ZL4 according to the fourth Example comprises, in order from the object side along the optical axis, a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group having negative refractive power.

The first lens group G1 comprises, in order from an object side along the optical axis, a cemented lens constructed by a negative meniscus lens L11 having a convex surface facing the object side cemented with a double convex lens L12, and a cemented lens constructed by a negative meniscus lens L13 having a convex surface facing the object side cemented with a negative meniscus lens L14 having convex surface facing the object side.

The second lens group G2 comprises, in order from the object side along the optical axis, a negative meniscus lens L21 having a convex surface facing the object side, a cemented lens constructed by a double concave lens L22 cemented with a double convex lens L23, and a negative meniscus lens L24 having a concave surface facing the object side.

The third lens group G3 comprises, in order from the object along the optical axis, a double convex lens L31, a cemented lens constructed by a double convex lens L32 cemented with a negative meniscus lens L33 having a concave surface facing the object side, and a negative meniscus lens L34 having a convex surface facing the object side.

The fourth lens group G4 comprises, in order from the object side, a positive meniscus lens L41 having a convex surface facing the object side, and a cemented lens constructed by a double concave lens L42 cemented with a positive meniscus lens L43 having a convex surface facing the object side.

The fifth lens group G5 comprises, in order from the object side along the optical axis, a positive meniscus lens L51 having a convex surface facing the object side, and a cemented lens constructed by a negative meniscus lens L52 having a convex surface facing the object side cemented with a double convex lens L53.

The sixth lens group G6 comprises, in order from the objective side, a cemented lens constructed by a double concave lens L61 cemented with a double convex lens L62.

In the zoom lens system ZL4 having such a configuration according to the present fourth example, upon zooming from the wide angle end state to the telephoto end state, each lens group is moved so that a distance between the first lens group G1 and the second lens group G2 is increased, a distance between the second lens group G2 and the third lens group G3 is decreased, a distance between the third lens group G3 and the fourth lens group G4 is varied, a distance between the fourth lens group G4 and the fifth lens group G5 is decreased, and a distance between the fifth lens group G5 and the sixth lens group G6 is increased. Note that, upon zooming from the wide angle end state to the telephoto end state, the first lens group G1 is fixed in the direction of the optical axis with respect to the image plane I.

The aperture stop S is disposed between the fourth lens group G4 and the fifth lens group G5 and is moved together with the fourth lens group G4 upon zooming from the wide angle end state to the telephoto end state.

In the zoom lens system ZL4 according to the fourth Example, the negative meniscus lens L34 among the lenses in the third lens group G3 is moved from the object side to the image side along the optical axis, upon focusing on from an infinitely distant object point to a close object point.

Incidentally, in the zoom lens system ZL4 according to the fourth Example, the lens L41 and the cemented lens constructed by the lens L42 cemented with the lens L43 are made to be a lens group for reducing vibration. This vibration reducing lens group is shifted in the direction perpendicular to the optical axis to carry out correction of the image plane at the time when camera shake is generated.

In the wide angle end state of the fourth example, blur correction coefficient K is −0.770, and the focal length is 81.6 (mm). Accordingly, amount of movement of the vibration reduction lens for correcting rotational shake of 0.350° is −0.676 (mm). In the telephoto end state of the fourth example, the blur correction coefficient is −1.253, and the focal length is 392 (mm), so the vibration reducing lens is required to be moved by −0.911 (mm) in order to correct rotational shake of 0.160°.

Various values associated with the zoom lens system ZL4 according to the fourth example are listed in Table 4 below.

Incidentally, surface numbers 1 to 34 shown in Table 4 correspond to surfaces 1 to 34 shown in FIG. 13. In (Lens Group Data), a starting surface ST and focal length of each of the first to sixth lens groups G1 to G6 are shown. It is noted, however, that the focal length of the third lens group G3 shows a value upon focusing infinity.

TABLE 4

| (Various Values) | | | |
|---|---|---|---|
| | W | M | T |
| f = | 81.6 | 200.0 | 392.0 |
| FNO = | 4.5 | 4.9 | 5.9 |
| TL = | 300.0 | 300.0 | 300.0 |
| 2ω = | 30.3 | 12.1 | 6.2 |
| Φ = | 25.2 | 28.0 | 32.0 |

TABLE 4-continued

| (Lens Data) | | | | |
|---|---|---|---|---|
| m | r | d | nd | νd |
| 1 | 90.3626 | 3.3 | 1.79952 | 42.1 |
| 2 | 64.4126 | 13.7 | 1.49782 | 82.6 |
| 3 | −323.4131 | 0.2 | | |
| 4 | 90.0991 | 3.0 | 1.84666 | 23.8 |
| 5 | 66.7633 | 6.9 | 1.59319 | 67.9 |
| 6 | 221.4083 | D1 | | |
| 7 | 289.4442 | 2.0 | 1.77250 | 49.6 |
| 8 | 54.5420 | 4.4 | | |
| 9 | −85.1025 | 2.0 | 1.75500 | 52.3 |
| 10 | 56.3666 | 5.6 | 1.80809 | 22.7 |
| 11 | −157.5631 | 1.9 | | |
| 12 | −63.3615 | 2.0 | 1.81600 | 46.6 |
| 13 | −303.6297 | D2 | | |
| 14 | 136.0550 | 4.7 | 1.72000 | 43.6 |
| 15 | −119.9075 | 0.2 | | |
| 16 | 128.5528 | 7.0 | 1.60300 | 65.4 |
| 17 | −76.6023 | 2.0 | 1.84666 | 23.8 |
| 18 | −1425.8055 | D3 | | |
| 19 | 53.8121 | 5.0 | 1.59319 | 67.9 |
| 20 | 43.5920 | D4 | | |
| 21 | 90.8618 | 2.0 | 1.83400 | 37.2 |
| 22 | 94.8728 | 2.6 | | |
| 23 | −116.9535 | 1.8 | 1.77250 | 49.6 |
| 24 | 287.3742 | 3.5 | 1.84666 | 23.8 |
| 25 | 844.7596 | 3.3 | | |
| 26 | 0.0000 | D5 | Aperture stop S | |
| 27 | 33.3813 | 4.9 | 1.80400 | 46.6 |
| 28 | 70.0018 | 13.3 | | |
| 29 | 65.7975 | 1.3 | 1.68893 | 31.2 |
| 30 | 18.9846 | 14.0 | 1.48749 | 70.3 |
| 31 | −54.3746 | D6 | | |
| 32 | −30.2199 | 1.5 | 1.81600 | 46.6 |
| 33 | 39.6615 | 4.5 | 1.80518 | 25.5 |
| 34 | −96.7465 | BF | | |

| (Lens Group Data) | | |
|---|---|---|
| Lens Group | ST | focusing distance |
| G1 | 1 | 114.4955 |
| G2 | 7 | −39.0000 |
| G3 | 14 | 82.4344 |
| G4 | 21 | −146.92377 |
| G5 | 27 | 52.83669 |
| G6 | 32 | −54.94003 |

| (Variable Distance Data) | | |
|---|---|---|
| | W | M | T |
| | INF | | |
| f | 81.6 | 200.0 | 392.0 |
| D0 | ∞ | ∞ | ∞ |
| D1 | 2.3136 | 25.2531 | 34.1938 |
| D2 | 74.5443 | 34.7297 | 2.0000 |
| D3 | 0.4000 | 0.4000 | 0.4000 |
| D4 | 18.5925 | 31.1663 | 25.7084 |
| D5 | 24.7359 | 10.4793 | 3.0850 |
| D6 | 5.1 | 5.2 | 5.3 |
| BF | 57.3932 | 76.0510 | 112.7924 |
| | CLD | | |
| β | −0.04 | −0.10 | −0.17 |
| D0 | 1500 | 1500 | 1500 |
| D1 | 2.3136 | 25.2531 | 34.1938 |
| D2 | 86.9877 | 52.0579 | 27.6034 |
| D3 | 0.7044 | 1.8063 | 4.4070 |
| D4 | 18.2881 | 29.7599 | 21.7014 |
| D5 | 24.7359 | 10.4793 | 3.0850 |
| D6 | 5.1 | 5.2 | 5.3 |
| BF | 57.3932 | 76.0510 | 112.7924 |

TABLE 4-continued (Value for Conditional Expressions)

(1) f1/f3 = 1.389
(2) f2/f4 = 0.265
(3) f3/(−f4) = 0.561
(4) (−f4)/f5 = 2.780

FIGS. 14A, 14B and 14C are graphs showing aberrations of the zoom lens system according to the fourth Example in a wide angle end state, in which FIG. 14A shows various aberrations upon focusing on infinity, FIG. 14B shows coma upon carrying out correction of blur upon focusing infinity, and FIG. 14C shows various aberrations upon focusing on a close distant object (where a photographing distance R of the entire system is 1.8 m (R=1.8 m)).

Figure 15A:
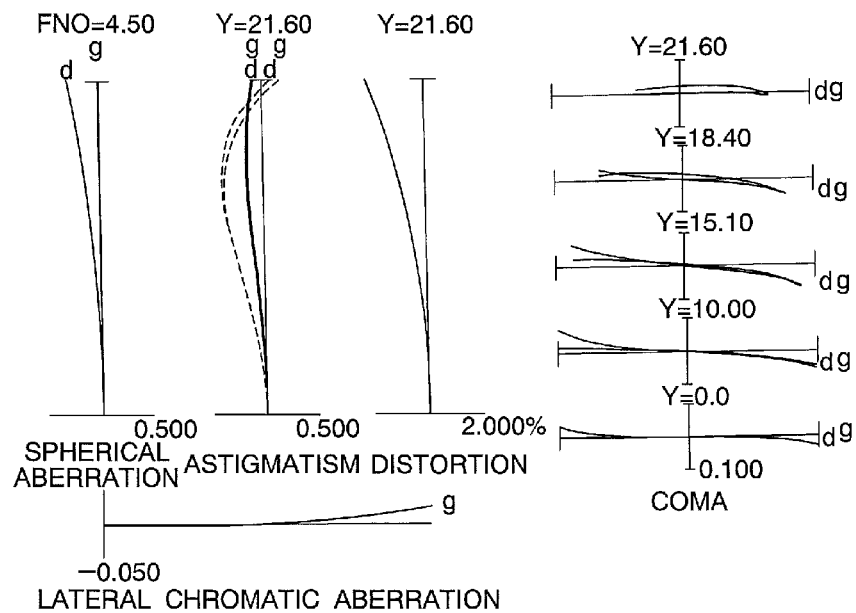
Figure 15B:
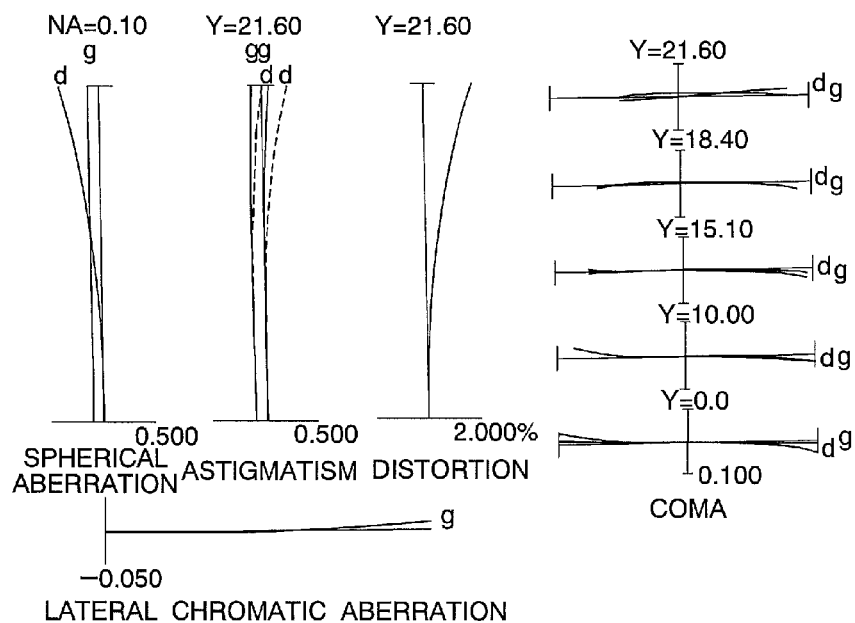

FIGS. 15A and 15B are graphs showing aberrations of the zoom lens system according to the fourth Example in an intermediate focal length state, in which FIG. 15A shows various aberrations upon focusing infinity and FIG. 15B shows various aberrations upon focusing on a close distant object (where a photographing distance R of the entire system is 1.8 m (R=1.8 m)).

FIGS. 16A, 16B and 16C are graphs showing aberrations of the zoom lens system according to the fourth Example in a telephoto end state, in which FIG. 16A shows various aberrations upon focusing infinity, FIG. 16B shows coma upon carrying out correction of blur upon focusing on infinity, and FIG. 16C shows various aberrations upon focusing on a close distant object (where a photographing distance R of the entire system is 1.8 m (R=1.8 m)). As is apparent from the respective graphs showing aberrations, the zoom lens system according to the fourth Example shows superb optical performance as a result of good corrections to various aberrations from the wide-angle end state to the telephoto end state.

Incidentally, the following description may suitably be applied within limits that do not deteriorate optical performance.

In the above described embodiment, although zoom lens system ZL having a five- or six-lens-group configuration has been shown, the above described requirements and the like to the lens configuration can be applied to other lens group configurations such as a seven-lens-group configuration and an eighth-lens-group configuration. Moreover, the lens configurations such as a configuration that a lens or a lens group is added to the most object side or a configuration in which a lens or a lens group is added to the most image side, may be adopted. Further, "a lens group" means a portion having at least one lens separated by air spaces varying upon zooming or focusing, or a portion having at least one lens separated as to if movement is made to have a component substantially perpendicular to the optical axis.

A single lens group or a plurality of lens groups, or a portion of a lens group may be moved along the optical axis as a focusing lens group for carrying out focusing from an infinity object point to a close range object point. In this case, the focusing lens group can be used for auto focus, and suitable for being driven by a motor (such as an ultrasonic motor) for auto focus. It is particularly preferable that at least a portion of the third lens group G3 in the present embodiment is used as the focusing lens group.

Moreover, a lens group or a portion of a lens group may be moved as a vibration reduction lens group in a direction having a component perpendicular to the optical axis or may be rotated (or rocking-moved) in a plane in which the optical axis is included, thereby correcting an image blur caused by a camera shake. In particular, in the present embodiment at least a portion of the fourth lens group G4 is preferably made as a vibration reduction lens group.

Moreover, lens surfaces may be formed as spherical surfaces like the zoom lens system ZL of the present embodiment, may include partly a plane surface or may be partly formed as aspherical surface(s). When a lens surface is an aspherical surface, the aspherical surface may be an aspherical surface formed by a grinding processing, by a glass molding process in which a glass material is formed into an aspherical surface in a mold, or by a compound type process in which a resin material is formed into an aspherical surface on a glass lens surface. Particularly, it is preferable that at least a portion of the second lens group G2, the third lens group G3, the fourth lens group G4 and the fifth lens group G5 may be made as aspherical surface(s). A lens surface may be a diffractive optical surface, and a lens may be a graded-index type lens (GRIN lens) or a plastic lens.

Although it is preferable that the aperture stop S is disposed in the vicinity of (preferably at the image side of) the fourth lens group G4, that function may be substituted by a lens frame, without providing a member as an aperture stop.

An antireflection coating having a high transmittance over a broad wavelength range may be applied onto each lens surface in order to reduce flare or ghost images and attain an optical performance with a high contrast.

Moreover, zoom ratio of the zoom lens system ZL according to the present embodiment is in the range of 4 to 6.

In the zoom lens system ZL according to the present embodiment, it is preferable that the first lens group G1 has two or three positive lenses and one or two negative lenses. Further, it is preferable that the first lens group G1 has, in order from the object side, an arrangement of a negative lens, a positive lens, a negative lens and a positive lens, or an arrangement of a negative lens, a positive lens, a positive lens, a negative lens and a positive lens. Incidentally, each lens may be a single lens or a cemented lens.

In the zoom lens system ZL according to the present embodiment, it is preferable that the second lens group G2 has one or two positive lenses and three negative lenses. Further, it is preferable that the second lens group G2 has, in order from the object side, an arrangement of a negative lens, a negative lens, a positive lens and a negative lens, or an arrangement of a positive lens, a negative lens, a negative lens, a positive lens and a negative lens. Incidentally, each lens may be a single lens or a cemented lens.

In the zoom lens system ZL according to the present embodiment, it is preferable that the third lens group G3 has two or three positive lenses and one or two negative lenses. Further, it is preferable that the third lens group G3 has, in order from the object side, an arrangement of a positive lens, a positive lens, a negative lens and a negative lens, or an arrangement of a positive lens, a positive lens, and a negative lens. Incidentally, each lens may be a single lens or a cemented lens.

In the zoom lens system ZL according to the present embodiment, it is preferable that the fourth lens group G4 has one or two positive lenses and one or two negative lenses. Further, it is preferable that the fourth lens group G4 has, in order from the object side, an arrangement of a positive lens, a negative lens and a positive lens, or an arrangement of a positive lens and a negative lens. Incidentally, each lens may be a single lens or a cemented lens.

In the zoom lens system ZL according to the present embodiment, it is preferable that the fifth lens group G5 has three or four positive lenses and two or three negative lenses. Further, it is preferable that the fifth lens group G5 has, in order from the object side, an arrangement of a positive lens, a negative lens, a positive lens, a negative lens and a positive lens. Incidentally, each lens may be a single lens or a cemented lens.

Explanation was made with referring to the structural requirements of the present embodiment for the purpose of better understanding of the present application. It is needless to say that the present application is not limited to the specific details above mentioned.

What is claimed is:

1. A zoom lens system comprising, in order from an object side: a first lens group having positive refractive power; a second lens group having negative refractive power; a third lens group having positive refractive power; a fourth lens group having negative refractive power; and a fifth lens group having positive refractive power;
upon zooming the first lens group being fixed with respect to an image plane in the direction of the optical axis,
upon focusing at least a portion of the third lens group being moved along the optical axis, and
the zoom lens system satisfying the following conditional expression:

$$0.010 < f1/f3 < 1.410,$$

where f1 denotes a focal length of the first lens group, and f3 denotes a focal length of the third lens group,
wherein
upon zooming from a wide angle end state to a telephoto end state, a distance between the first lens group and the second lens group is increased, a distance between the second lens group and the third lens group is decreased, a distance between the third lens group and the fourth lens group is increased, and a distance between the fourth lens group and the fifth lens group is decreased.

2. The zoom lens system according to claim 1, wherein the following conditional expression is satisfied:

$$0.160 < f2/f4 < 0.370,$$

where f2 denotes a focal length of the second lens group, and
f4 denotes a focal length of the fourth lens group.

3. The zoom lens system according to claim 1, wherein the following conditional expression is satisfied:

$$0.370 < f3/(-f4) < 0.620,$$

where f3 denotes a focal length of the third lens group, and
f4 denotes a focal length of the fourth lens group.

4. The zoom lens system according to claim 1, wherein the following conditional expression is satisfied:

$$1.140 < (-f4)/f5 < 1.540,$$

where f4 denotes a focal length of the fourth lens group, and
f5 denotes a focal length of the fifth lens group.

5. The zoom lens system according to claim 1, wherein, at least a portion of the fourth lens group is so moved in a direction to include a component perpendicular to an optical axis.

6. The zoom lens system according to claim 1, wherein, upon zooming, a distance between the first lens group and the second lens group is varied, a distance between the second lens group and the third lens group is varied, a distance between the third lens group and the fourth lens group is varied, and a distance between the fourth lens group and the fifth lens group is varied.

7. The zoom lens system according to claim 1, wherein, all of the lens surfaces are spherical.

8. An optical apparatus equipped with a zoom lens system according to claim 1.

9. The zoom lens system according to claim 1, wherein, upon zooming, the second lens group, the third lens group, the fourth lens group and the fifth lens group are moved.

10. The zoom lens system according to claim 1, wherein, upon focusing on an infinitely distant object point to a close object point, the third lens group is moved from the object side to the image side.

11. A method for manufacturing a zoom lens system which comprises, in order from an object side: a first lens group having positive refractive power; a second lens group having negative refractive power; a third lens group having positive refractive power; a fourth lens group having negative refractive power; and a fifth lens group having positive refractive power, the method comprising steps of disposing the lens groups such that, upon zooming, the first lens group being fixed with respect to an image plane in the direction of the optical axis; disposing the lens groups such that, upon focusing, at least a portion of the third lens group is moved along the optical axis, and disposing the lens groups such that the zoom lens system satisfies the following conditional expression:

$$0.010 < f1/f3 < 1.410,$$

where f1 denotes a focal length of the first lens group, and f3 denotes a focal length of the third lens group,
wherein upon zooming from a wide angle end state to a telephoto end state, a distance between the first lens group and the second lens group is increased, a distance between the second lens group and the third lens group is decreased, a distance between the third lens group and the fourth lens group is increased, and a distance between the fourth lens group and the fifth lens group is decreased.

12. A zoom lens system comprising, in order from an object side: a first lens group having positive refractive power; a second lens group having negative refractive power; a third lens group having positive refractive power; a fourth lens group having negative refractive power; and a fifth lens group having positive refractive power;
upon zooming the first lens group being fixed with respect to an image plane in the direction of the optical axis,
upon focusing at least a portion of the third lens group being moved along the optical axis, and
the zoom lens system satisfying the following conditional expression:

$$0.010 < f1/f3 < 1.410,$$

where f1 denotes a focal length of the first lens group, and f3 denotes a focal length of the third lens group,
wherein,
upon zooming, the second lens group, the third lens group, the fourth lens group and the fifth lens group are moved.

13. The zoom lens system according to claim 12, wherein the following conditional expression is satisfied:

$$0.160 < f2/f4 < 0.370,$$

where f2 denotes a focal length of the second lens group, and
f4 denotes a focal length of the fourth lens group.

14. The zoom lens system according to claim 12, wherein the following conditional expression is satisfied:

$$0.370 < f3/(-f4) < 0.620,$$

where f3 denotes a focal length of the third lens group, and
f4 denotes a focal length of the fourth lens group.

15. The zoom lens system according to claim 12, wherein the following conditional expression is satisfied:

$$1.140 < (-f4)/f5 < 1.540,$$

where f4 denotes a focal length of the fourth lens group, and
f5 denotes a focal length of the fifth lens group.

16. An optical apparatus equipped with a zoom lens system according to claim 12.

17. A method for manufacturing a zoom lens system comprising:
providing in order from an object side: a first lens group having positive refractive power; a second lens group having negative refractive power; a third lens group having positive refractive power; a fourth lens group having negative refractive power; and a fifth lens group having positive refractive power;
constructing the zoom lens system such that:
upon zooming the first lens group being fixed with respect to an image plane in the direction of the optical axis,
upon focusing at least a portion of the third lens group being moved along the optical axis, and
the zoom lens system satisfies the following conditional expression:

$$0.010 < f1/f3 < 1.410,$$

where f1 denotes a focal length of the first lens group, and f3 denotes a focal length of the third lens group, and
upon zooming, the second lens group, the third lens group, the fourth lens group and the fifth lens group are moved.

18. A zoom lens system comprising, in order from an object side: a first lens group having positive refractive power; a second lens group having negative refractive power; a third lens group having positive refractive power; a fourth lens group having negative refractive power; and a fifth lens group having positive refractive power;
upon zooming the first lens group being fixed with respect to an image plane in the direction of the optical axis,
upon focusing at least a portion of the third lens group being moved along the optical axis, and
the zoom lens system satisfying the following conditional expression:

$$0.010 < f1/f3 < 1.410,$$

where f1 denotes a focal length of the first lens group, and f3 denotes a focal length of the third lens group,
wherein the following conditional expression is satisfied:

$$0.370 < f3/(-f4) < 0.620,$$

where f4 denotes a focal length of the fourth lens group.

19. The zoom lens system according to claim 18, wherein the following conditional expression is satisfied:

$$0.160 < f2/f4 < 0.370,$$

where f2 denotes a focal length of the second lens group.

20. The zoom lens system according to claim 18, wherein the following conditional expression is satisfied:

$$1.140 < (-f4)/f5 < 1.540,$$

Where f5 denotes a focal length of the fifth lens group.

21. An optical apparatus equipped with a zoom lens system according to claim 18.

22. A method for manufacturing a zoom lens system comprising:
providing in order from an object side: a first lens group having positive refractive power; a second lens group having negative refractive power; a third lens group having positive refractive power; a fourth lens group having negative refractive power; and a fifth lens group having positive refractive power;
constructing the zoom lens system such that:
upon zooming the first lens group being fixed with respect to an image plane in the direction of the optical axis,
upon focusing at least a portion of the third lens group being moved along the optical axis, and
the zoom lens system satisfies the following conditional expression:

$$0.010 < f1/f3 < 1.410,$$

where f1 denotes a focal length of the first lens group, and f3 denotes a focal length of the third lens group,
and the following conditional expression is satisfied:

$$0.370 < f3/(-f4) < 0.620,$$

where f4 denotes a focal length of the fourth lens group.

23. A zoom lens system comprising, in order from an object side: a first lens group having positive refractive power; a second lens group having negative refractive power; a third lens group having positive refractive power; a fourth lens group having negative refractive power; and a fifth lens group having positive refractive power;
upon zooming the first lens group being fixed with respect to an image plane in the direction of the optical axis,
upon focusing at least a portion of the third lens group being moved along the optical axis, and
the zoom lens system satisfying the following conditional expression:

$$0.010 < f1/f3 < 1.410,$$

where f1 denotes a focal length of the first lens group, and f3 denotes a focal length of the third lens group,
wherein the following conditional expression is satisfied:

$$1.140 < (-f4)/f5 < 1.540,$$

where f4 denotes a focal length of the fourth lens group, and
f5 denotes a focal length of the fifth lens group.

24. The zoom lens system according to claim 23, wherein the following conditional expression is satisfied:

$$0.160 < f2/f4 < 0.370,$$

where f2 denotes a focal length of the second lens group.

25. The zoom lens system according to claim 23, wherein, upon focusing on an infinitely distant object point to a close object point, the third lens group is moved from the object side to the image side.

26. An optical apparatus equipped with a zoom lens system according to claim 23.

27. A method for manufacturing a zoom lens system comprising:
providing in order from an object side: a first lens group having positive refractive power; a second lens group having negative refractive power; a third lens group having positive refractive power; a fourth lens group having negative refractive power; and a fifth lens group having positive refractive power;
constructing the zoom lens system such that:
upon zooming the first lens group being fixed with respect to an image plane in the direction of the optical axis,
upon focusing at least a portion of the third lens group being moved along the optical axis, and
the zoom lens system satisfies the following conditional expression:

$$0.010 < f1/f3 < 1.410,$$

where f1 denotes a focal length of the first lens group, and f3 denotes a focal length of the third lens group,
and the following conditional expression is satisfied:

$$1.140 < (-f4)/f5 < 1.540,$$

where f4 denotes a focal length of the fourth lens group, and
f5 denotes a focal length of the fifth lens group.

\* \* \* \* \*